(12) United States Patent
Le

(10) Patent No.: US 7,070,698 B2
(45) Date of Patent: Jul. 4, 2006

(54) METHODS OF FABRICATING MAGNETIC WRITE HEADS WITH SIDE AND TRAILING SHIELD STRUCTURES

(75) Inventor: Quang Le, San Jose, CA (US)

(73) Assignee: Hitachi Global Storage Technologies Netherlands B.V., Amsterdam (NL)

( * ) Notice: Subject to any disclaimer, the term of this patent is extended or adjusted under 35 U.S.C. 154(b) by 58 days.

(21) Appl. No.: 10/881,278

(22) Filed: Jun. 30, 2004

(65) Prior Publication Data

US 2006/0000794 A1   Jan. 5, 2006

(51) Int. Cl.
*B44C 1/22* (2006.01)
*G11B 5/127* (2006.01)

(52) U.S. Cl. .............................. 216/22; 216/41; 216/67; 29/603.13; 29/603.14; 29/603.15; 29/603.18; 360/113

(58) Field of Classification Search .................. 216/22, 216/41, 67; 29/603.13, 603.14, 603.15, 603.16, 29/603.18; 360/113
See application file for complete search history.

(56) References Cited

U.S. PATENT DOCUMENTS

| 4,935,832 A | 6/1990 | Das et al. |
| 5,075,956 A | 12/1991 | Das |
| 5,103,553 A | 4/1992 | Mallary |
| RE33,949 E | 6/1992 | Mallary et al. |
| 5,181,151 A | 1/1993 | Yamashita et al. |
| 2001/0035357 A1* | 11/2001 | Sasaki ........................ 205/922 |
| 2002/0071208 A1 | 6/2002 | Batra et al. |
| 2002/0109947 A1 | 8/2002 | Khizroev et al. |
| 2002/0176214 A1 | 11/2002 | Shukh et al. |

(Continued)

FOREIGN PATENT DOCUMENTS

JP    57037712    3/1982

(Continued)

OTHER PUBLICATIONS

Yasushi Kanai, Recording field analysis of narrow-track SPT head with side shields, tapered main pole, and tapered return path for 1 Tb/in2. IEEE Transactions on Magnetics, Jul. 2003, pp. 1955-1960, v39. n.4.

(Continued)

*Primary Examiner*—Shamim Ahmed
(74) *Attorney, Agent, or Firm*—John J. Oskorep, Esq.; Rambod Nadar

(57) ABSTRACT

One illustrative method of fabricating magnetic write heads includes the acts of forming a pole tip structure at least partially over a magnetic shaping layer; forming non-magnetic materials around and over the pole tip structure; etching side shield voids within the non-magnetic materials adjacent the pole tip structure while leaving non-magnetic materials around the pole tip structure; electroplating side shield materials within the side shield voids; and forming, over the non-magnetic materials above the pole tip structure, trailing shield materials which connect with the side shield materials adjacent the pole tip structure. Preferably, the non-magnetic materials are etched with use of a reactive ion etching (RIE) process. For etching the side shield voids and electroplating the side shield materials, the method may include the additional acts of forming a stop layer over the non-magnetic materials; forming a resist layer over the stop layer; patterning side shield openings through the resist layer; etching the side shield voids in the non-magnetic materials with the patterned resist layer in place; removing the patterned resist layer; electroplating the side shield materials over the non-magnetic materials and within the side shield voids; and performing a chemical-mechanical polishing (CMP) until the stop layer is reached.

31 Claims, 15 Drawing Sheets

U.S. PATENT DOCUMENTS

| | | |
|---|---|---|
| 2003/0002211 A1 | 1/2003 | Tsuchiya et al. |
| 2004/0218307 A1* | 11/2004 | Kuroda et al. .............. 360/126 |
| 2005/0190479 A1* | 9/2005 | Terris et al. .................. 360/59 |

FOREIGN PATENT DOCUMENTS

| | | |
|---|---|---|
| JP | 61198412 | 9/1986 |
| JP | 62262213 | 11/1987 |
| JP | 6180810 | 6/1994 |
| JP | 2002298309 | 10/2002 |
| WO | WO0239432 | 5/2002 |

OTHER PUBLICATIONS

Yasushi Kanai, Numerical analysis of narrow-track single-pole-type head with side shields for Tb/in.2, Journal of applied Physics, May 15, 2003, pp. 7738-7740, vol. 93 #10, American institute of Physics.

* cited by examiner

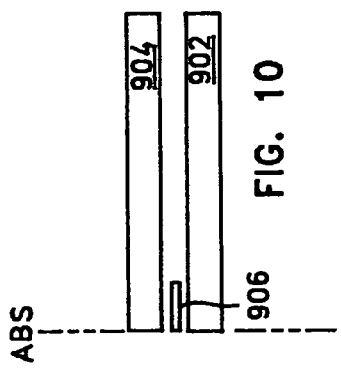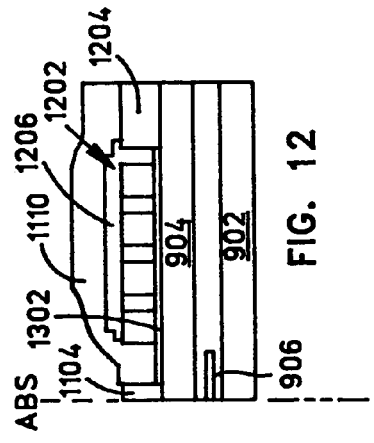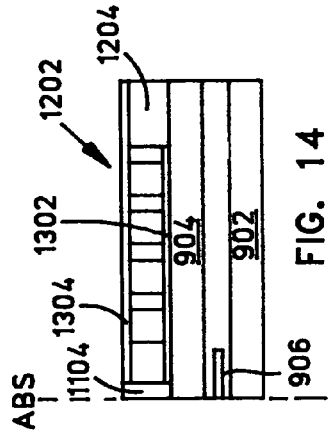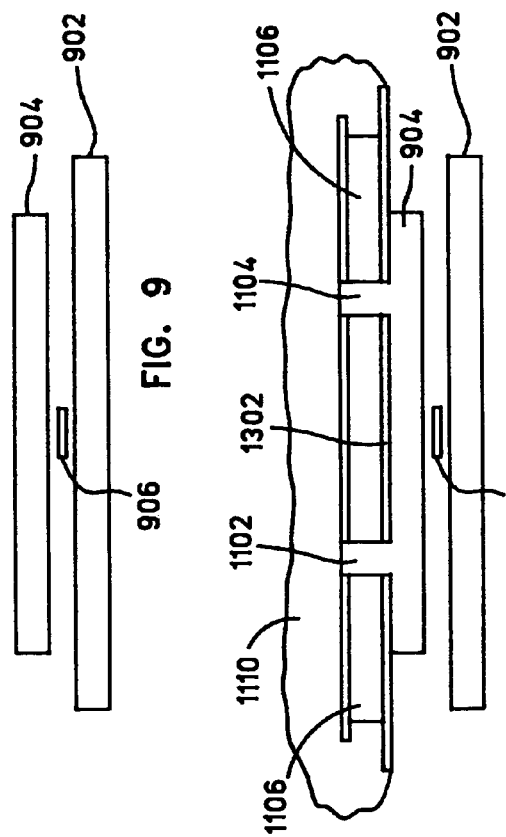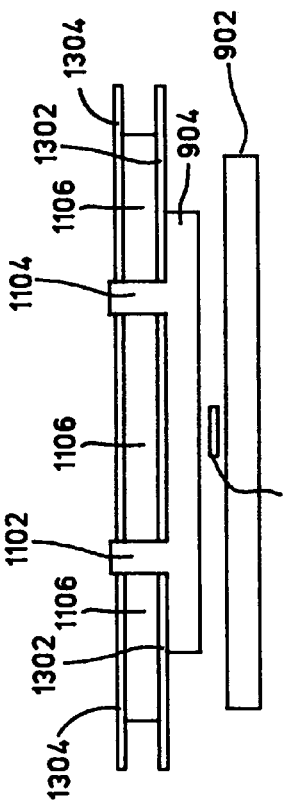

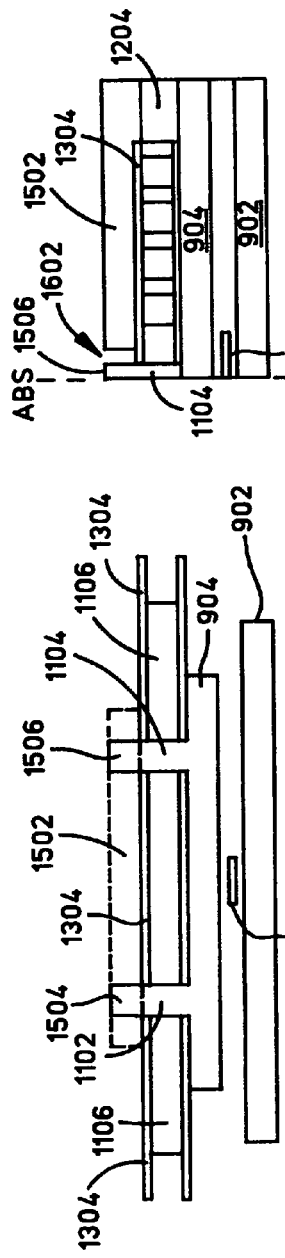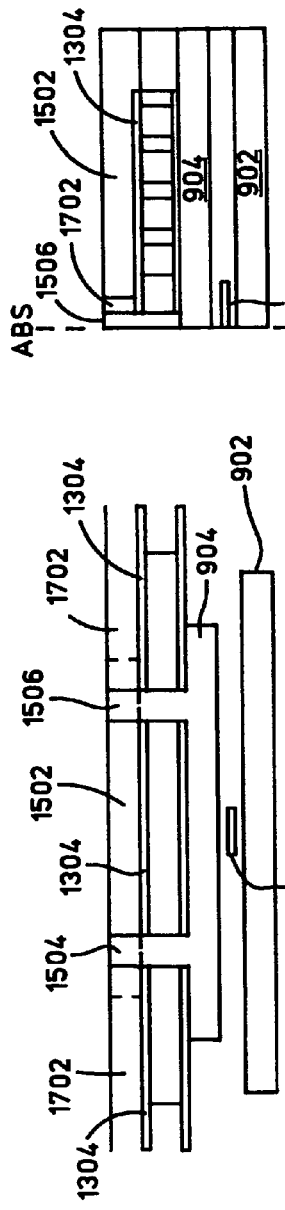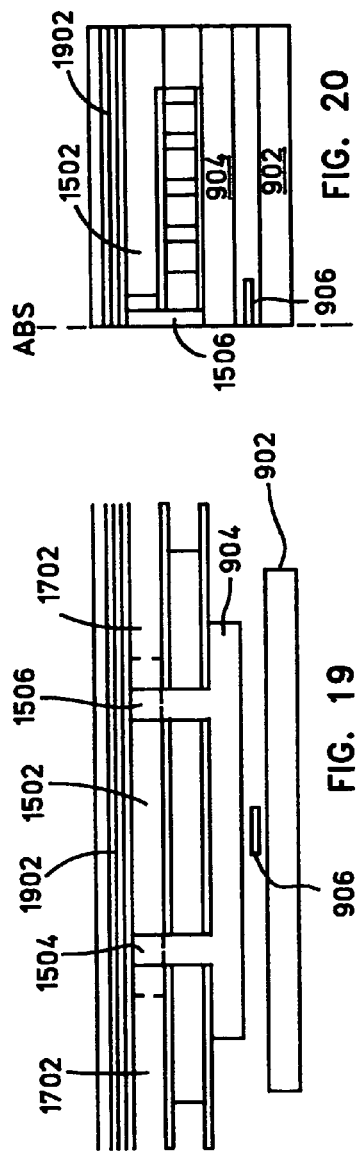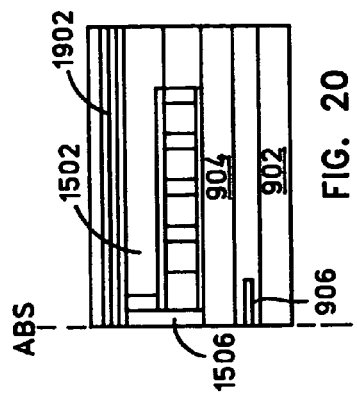

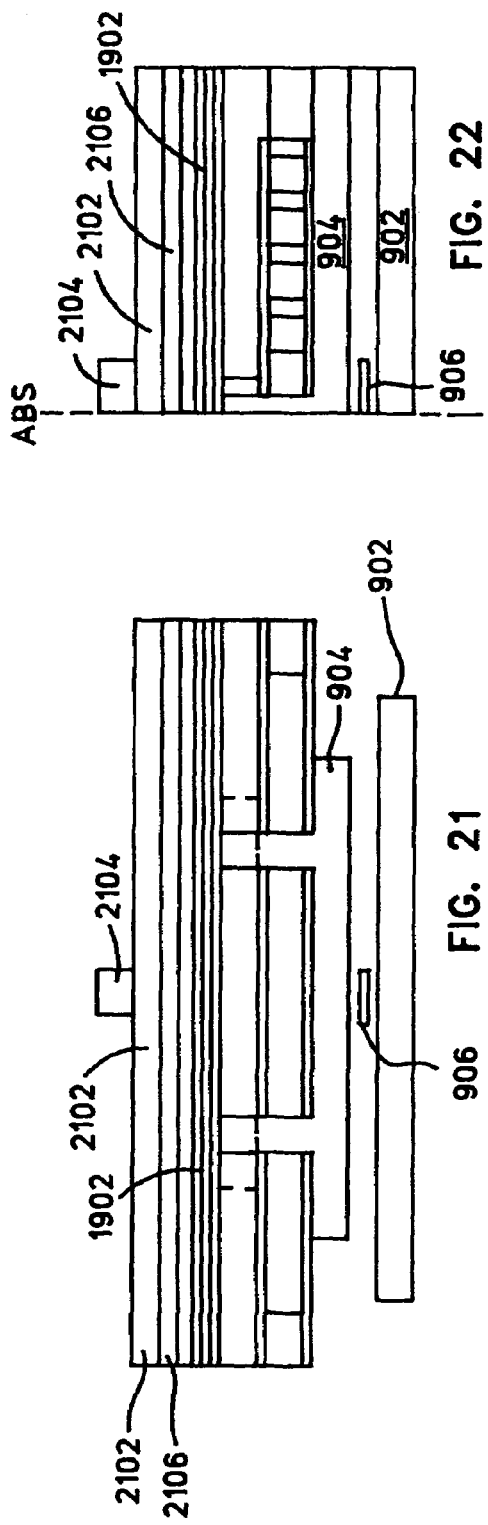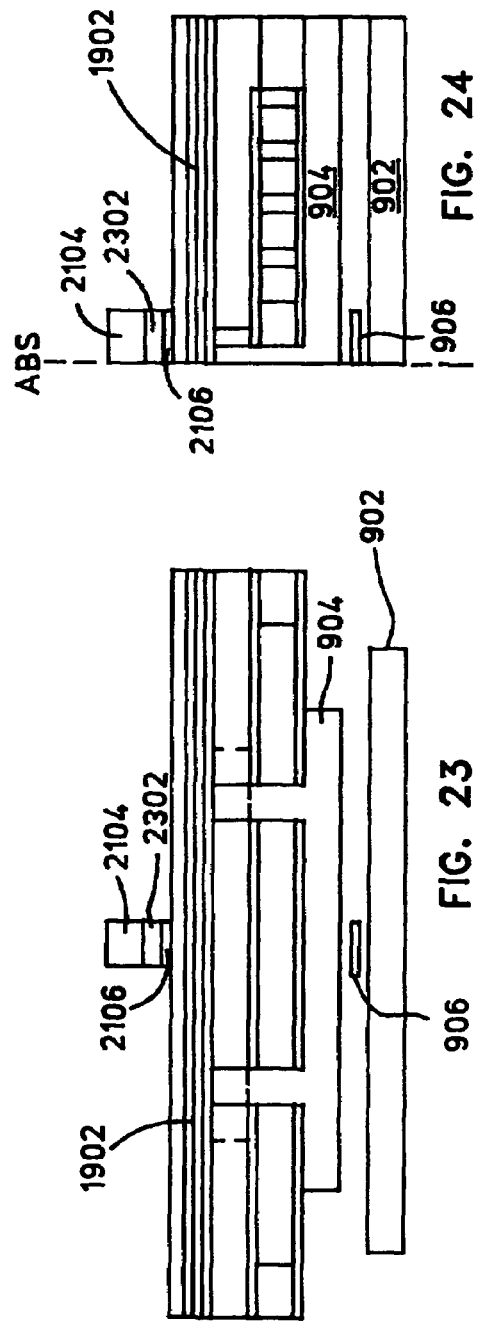

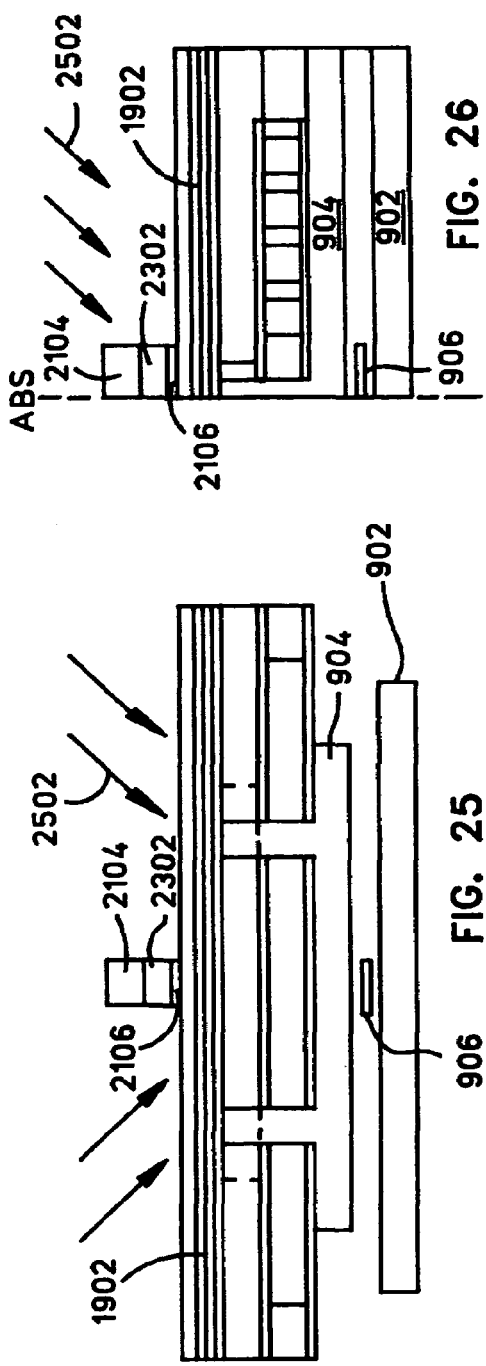
FIG. 25
FIG. 26
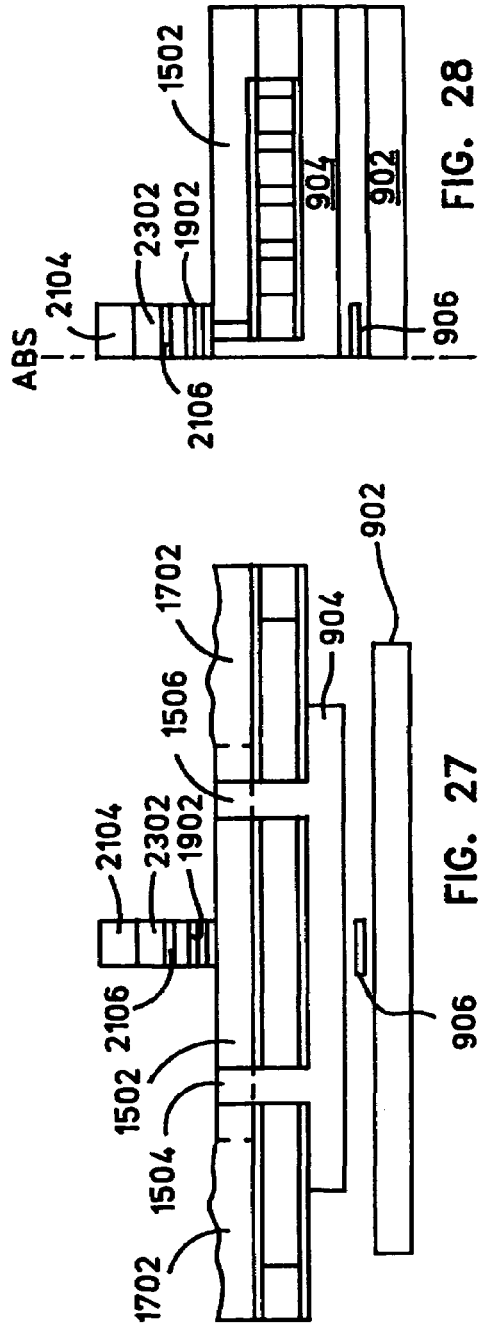
FIG. 27
FIG. 28

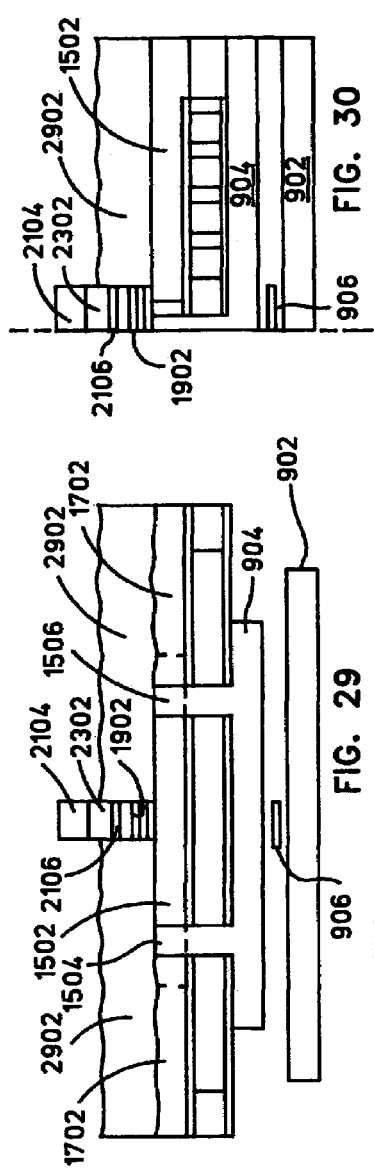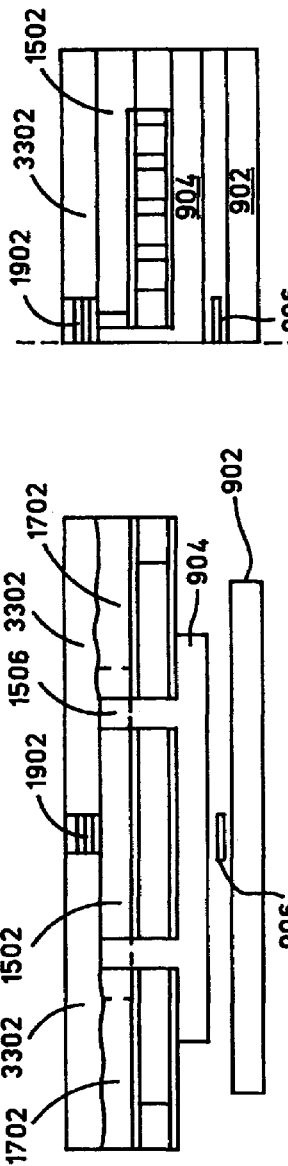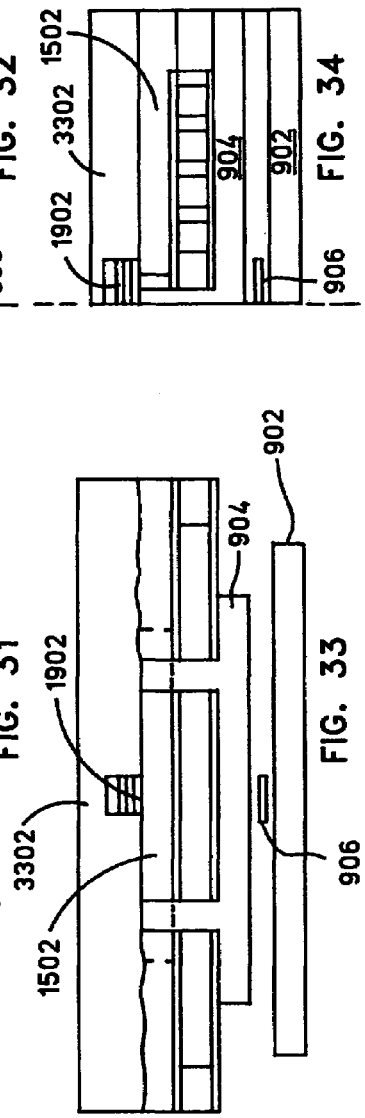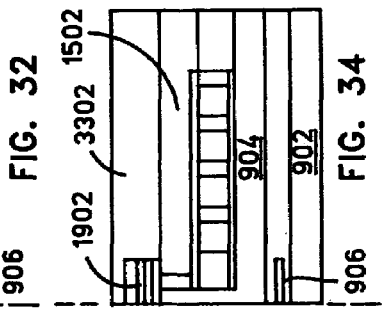

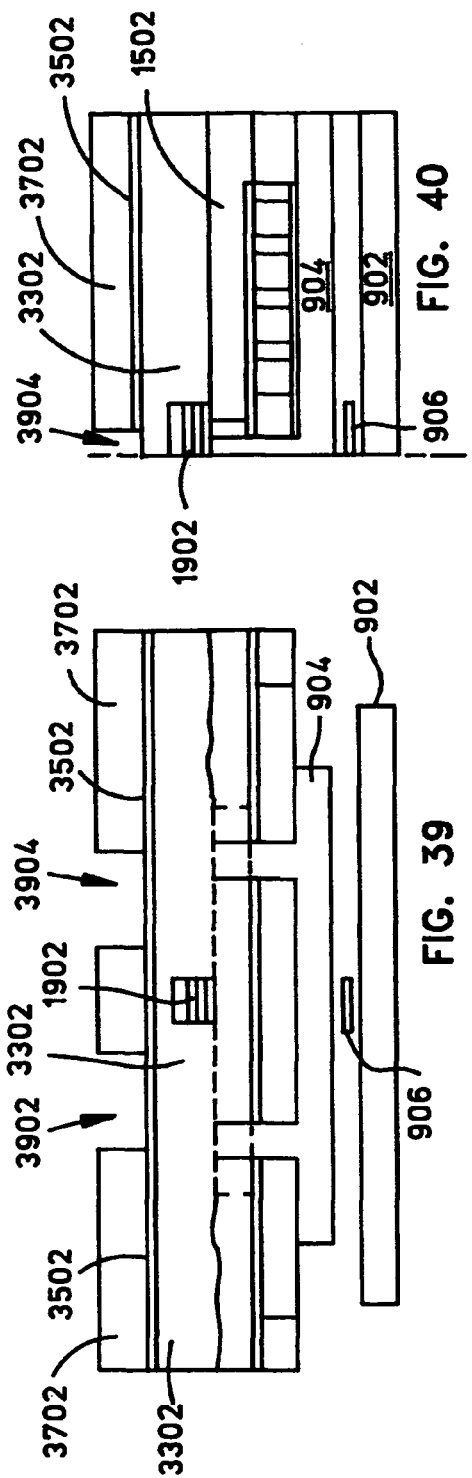
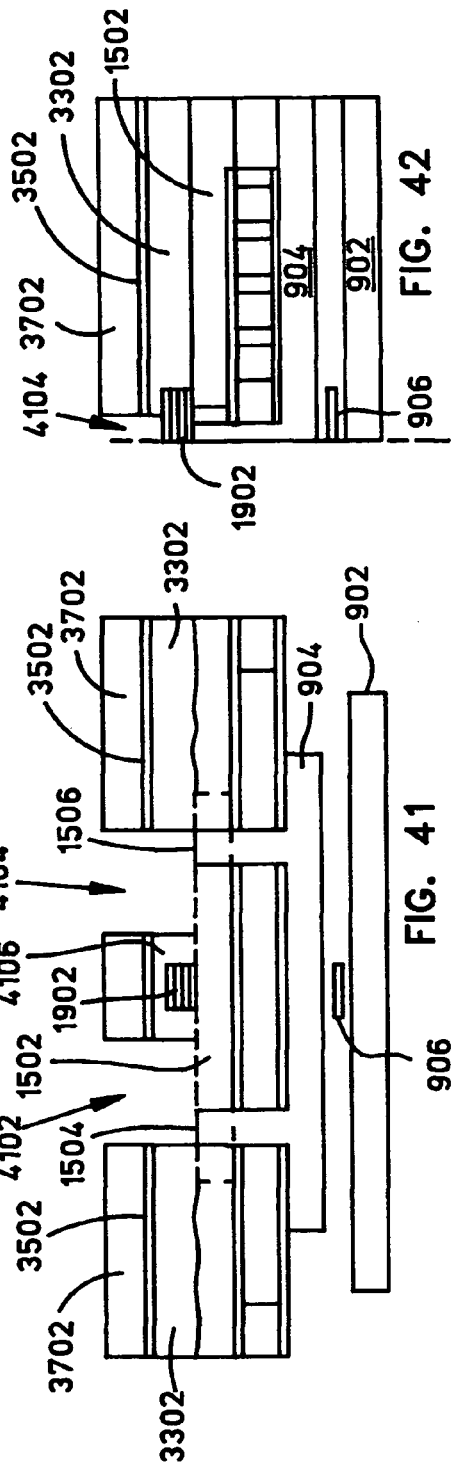

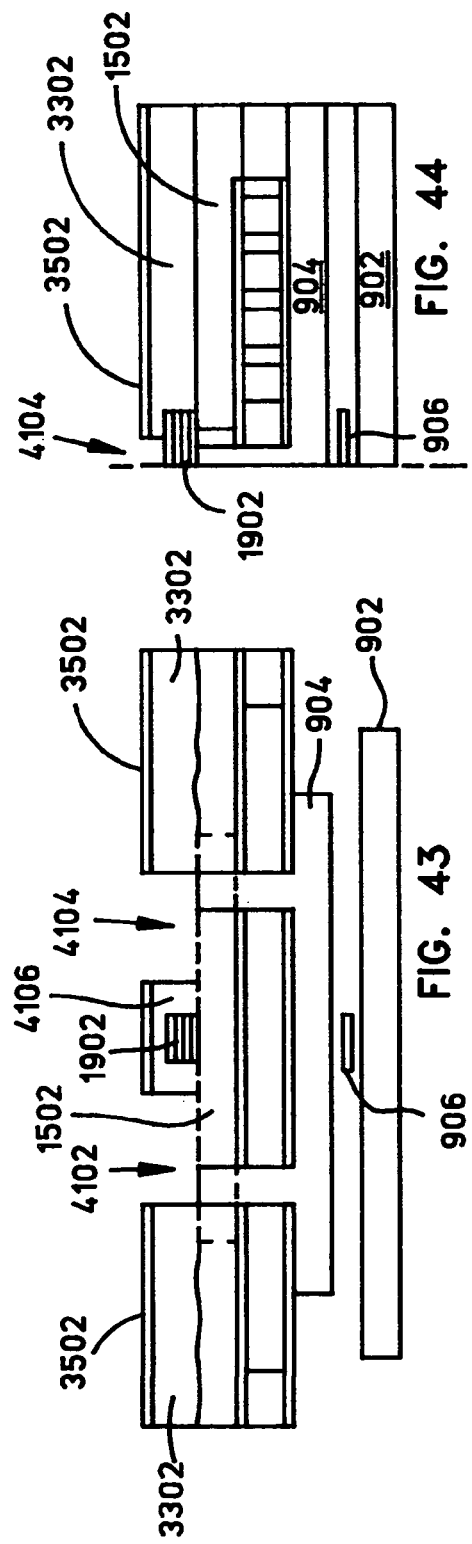
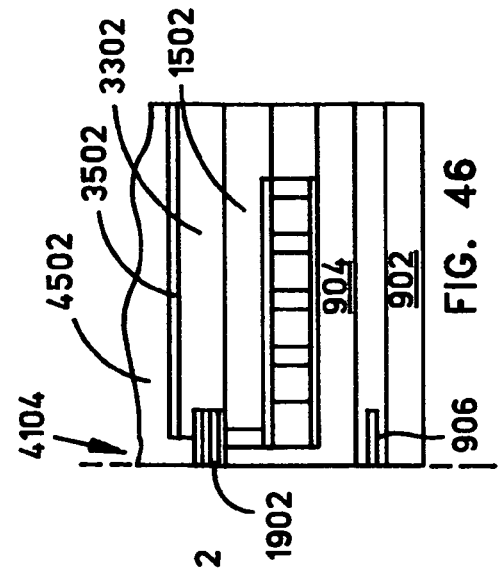
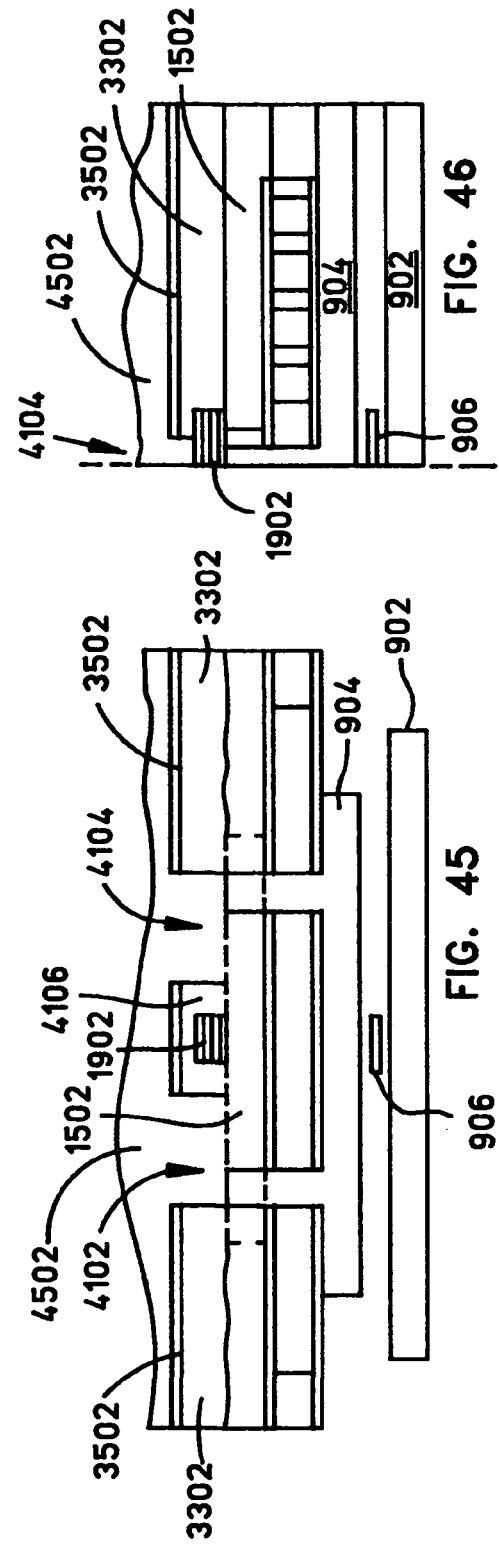

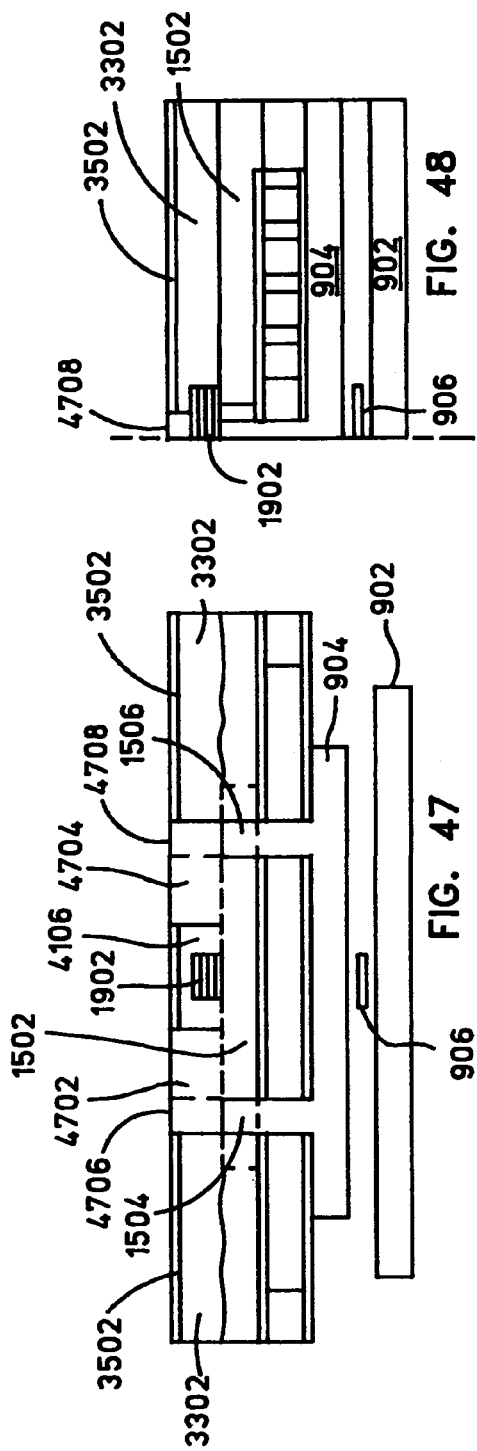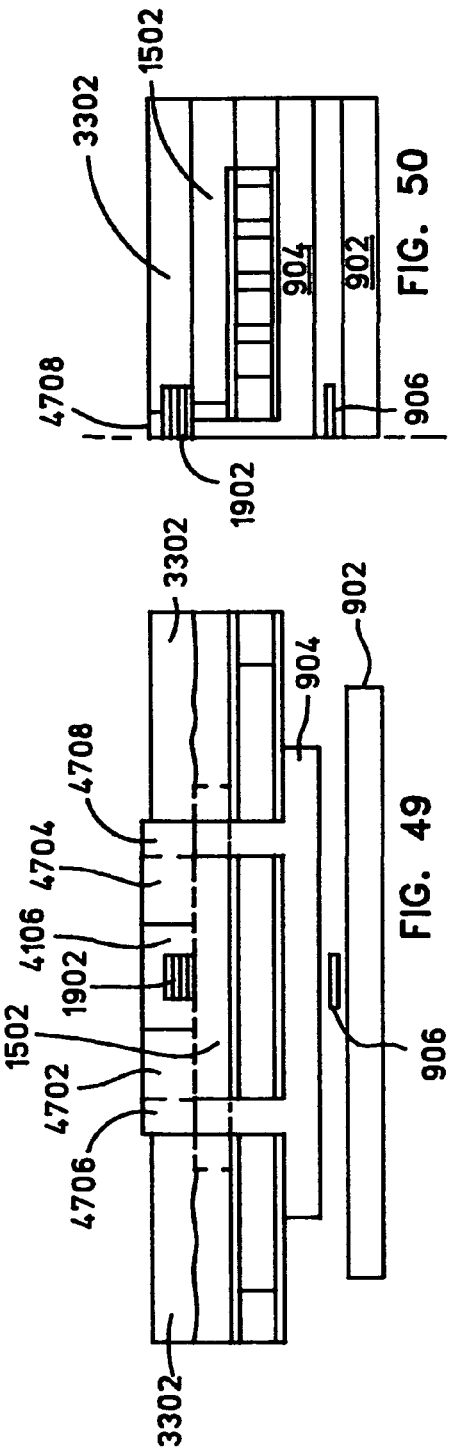

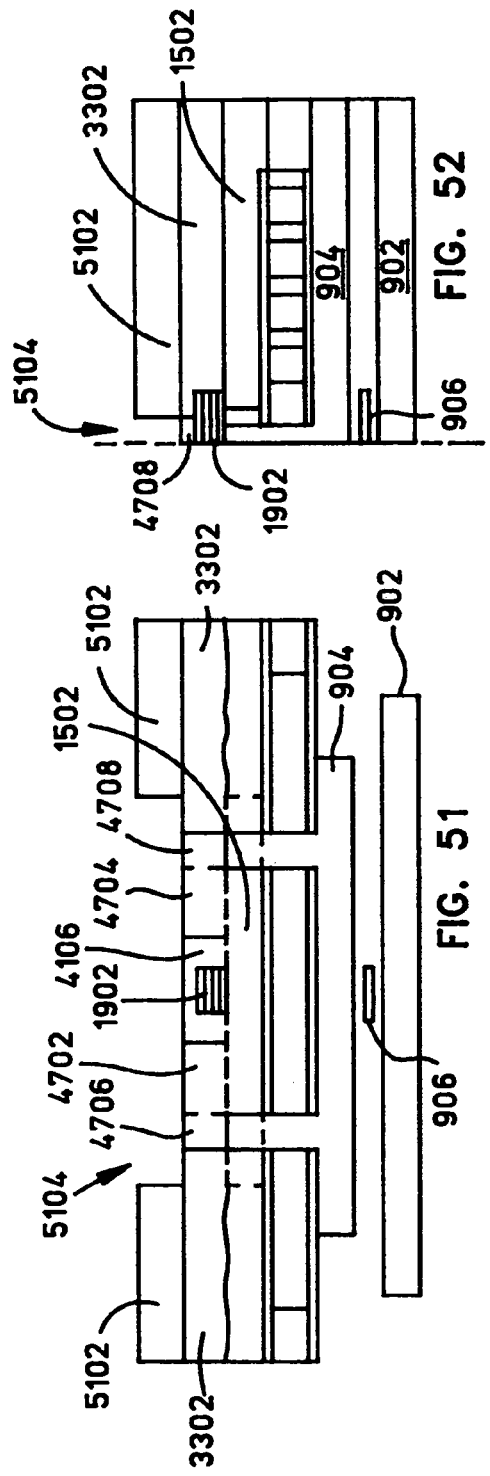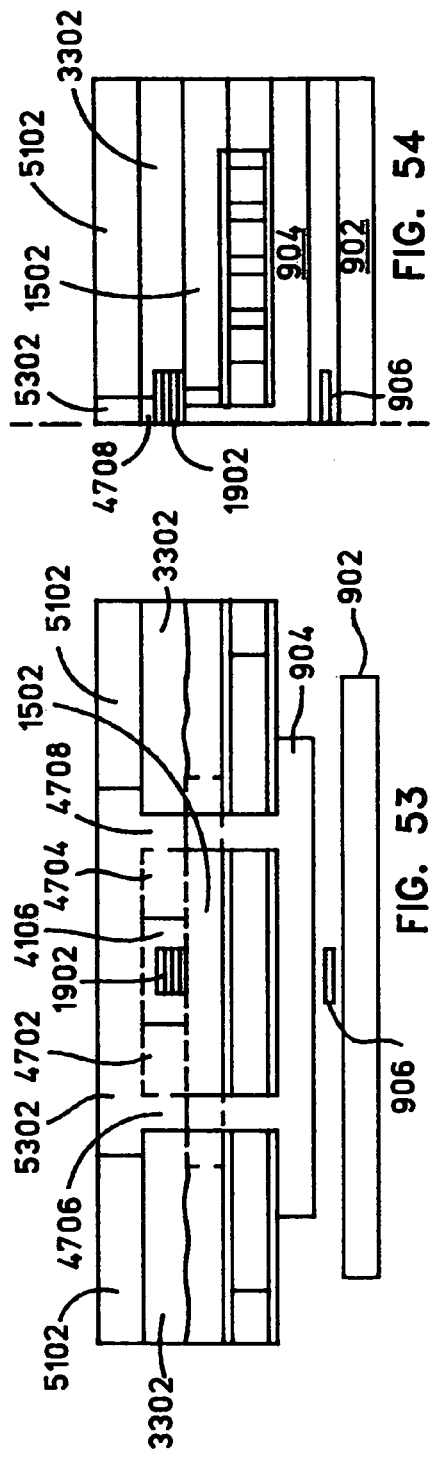

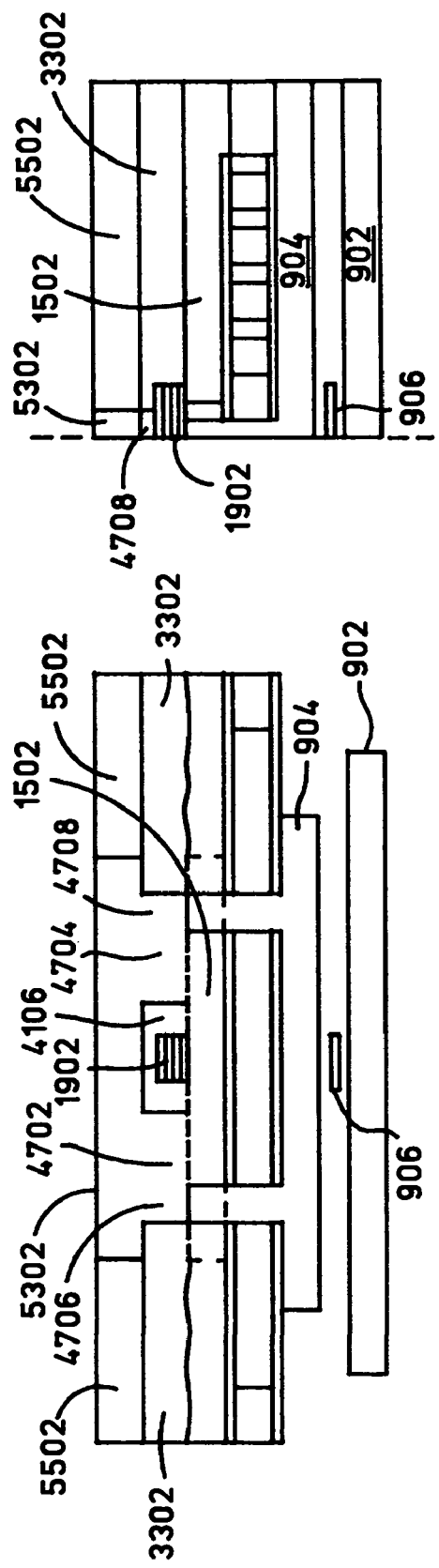

METHODS OF FABRICATING MAGNETIC WRITE HEADS WITH SIDE AND TRAILING SHIELD STRUCTURES

BACKGROUND OF THE INVENTION

1. Field of the Invention

This invention relates generally to magnetic heads in disk drives, and more particularly to improved methods of making magnetic write heads with side and trailing shield structures.

2. Description of the Related Art

A write head is typically combined with a magnetoresistive (MR) read head to form a merged MR head, certain elements of which are exposed at an air bearing surface (ABS). In conventional designs, the write head comprises first and second pole pieces connected at a back gap that is recessed from the ABS. The first and second pole pieces have first and second pole tips, respectively, which terminate at the ABS. An insulation stack, which comprises a plurality of insulation layers, is sandwiched between the first and second pole pieces, and a coil layer is embedded in the insulation stack. A processing circuit is connected to the coil layer for conducting write current through the coil layer which, in turn, induces write fields in the first and second pole pieces. A non-magnetic gap layer is sandwiched between the first and second pole tips. Write fields of the first and second pole tips at the ABS fringe across the gap layer. In a magnetic disk drive, a magnetic disk is rotated adjacent to, and a short distance (fly height) from, the ABS so that the write fields magnetize the disk along circular tracks. The written circular tracks then contain information in the form of magnetized segments with fields detectable by the MR read head.

An MR read head includes an MR sensor sandwiched between first and second non-magnetic gap layers, and located at the ABS. The first and second gap layers and the MR sensor are sandwiched between first and second shield layers. In a merged MR head, the second shield layer and the first pole piece are a common layer. The MR sensor detects magnetic fields from the circular tracks of the rotating disk by a change in resistance that corresponds to the strength of the fields. A sense current is conducted through the MR sensor, where changes in resistance cause voltage changes that are received by the processing circuitry as readback signals.

One or more merged MR heads may be employed in a magnetic disk drive for reading and writing information on circular tracks of a rotating disk. A merged MR head is mounted on a slider that is carried on a suspension. The suspension is mounted to an actuator which rotates the magnetic head to locations corresponding to desired tracks. As the disk rotates, an air layer (an "air bearing") is generated between the rotating disk and an air bearing surface (ABS) of the slider. A force of the air bearing against the air bearing surface is opposed by an opposite loading force of the suspension, causing the magnetic head to be suspended a slight distance (flying height) from the surface of the disk.

As the lifetime of longitudinal magnetic recording to achieve higher a real density may have reached its limit, however, perpendicular magnetic recording has received renewed interest to extend to ultra-high density magnetic recording. Recent demonstrations have shown that excellent recording performance can be achieved at areal densities as high as 150 gigabit/in$^2$ using a single pole recording head (SP) on perpendicular media with soft underlayers. Thus, SP with a leading edge tapering (LET) design may be suitable alternative for perpendicular magnetic recording. However, exploratory magnetic modeling and characterization on perpendicular head design suggest that higher a real density can be achieved by incorporating side and trailing shields into the single pole writer design (SPT). Improvements of the SPT design over the SP design can be explained by the Stoner-Wohlfarth model for a single particle.

FIG. 8 is a plot 800 of H-grain angle as a function of mean grain angle in the Stoner-Wohlfarth model for the SPT design. From plot 800, one can assess that for a distribution angle of grain angles, increasing the angle between H and mean grain angle decreases the distribution of switching fields by one-half to thereby increase the effective field by two times and reduce jitter. By effectively angling the write field, an SPT design can achieve a 4–5 dB media signal-to-noise advantage over writing with the trailing edge of an unshielded pole, increase dHy/dx of the write field, reduce partial erasure, and improve saturation. These features improve transition sharpness (linear resolution) and permit higher coercive field media (improved stability). These are preferred parameters for higher a real density targets.

Suitable methods are needed for fabricating such write heads with side and trailing shields. Although damascene techniques have been utilized in the fabrication of write head structures such as the write coil, the electroplated material (e.g. copper) is not an alloy and is non-magnetic. Damascene techniques also require a bath additive to suppress plating in particular desired areas.

SUMMARY

Methods of fabricating magnetic write heads having side and trailing shields are described herein. One illustrative method includes the acts of forming a pole tip structure at least partially over a magnetic shaping layer; forming non-magnetic materials around and over the pole tip structure; etching side shield voids within the non-magnetic materials adjacent the pole tip structure while leaving non-magnetic materials around the pole tip structure; electroplating side shield materials within the side shield voids; and forming, over the non-magnetic materials above the pole tip structure, trailing shield materials which connect with the side shield materials adjacent the pole tip structure. Preferably, the non-magnetic materials are etched with use of a reactive ion etching (RIE) process.

For etching the side shield voids and electroplating the side shield materials, the method may include the additional acts of forming a stop layer over the non-magnetic materials; forming a resist layer over the stop layer; patterning and developing side shield openings through the resist layer; etching the side shield voids in the non-magnetic materials with the patterned resist layer in place; removing the patterned resist layer; electroplating the side shield materials over the non-magnetic materials and within the side shield voids; and performing a planarization process (e.g. a chemical-mechanical polishing or CMP) until the stop layer is reached, which both removes side shield materials and provides a top planarized surface over the structure.

Additional and alternative techniques are also described herein, for forming side shield structures and/or trailing shield structures separately or together.

BRIEF DESCRIPTION OF THE DRAWINGS

For a fuller understanding of the nature and advantages of the present invention, as well as the preferred mode of use, reference should be made to the following detailed description read in conjunction with the accompanying drawings:

FIGS. 9–10 are a first pair of several ABS and cross-sectional view pairs of partially constructed magnetic heads of FIGS. 9–56 which help describe the method of making the write head structure of the present application, where a read sensor is formed in between bottom and top shield layers;

FIGS. 11–12 are a second pair of the views of the partially constructed magnetic heads of FIGS. 9–56, which are the same as that shown and described in relation to FIGS. 9–10 except that two side studs are formed over the top shield layer, write coils are formed, and non-magnetic insulator materials are formed over the resulting structure;

FIGS. 13–14 are a third pair of the views of the partially constructed magnetic heads of FIGS. 9–56, which are the same as that shown and described in relation to FIGS. 15–16 except that a planarization process is performed over the non-magnetic materials;

FIGS. 15–16 are a fourth pair of the views of the partially constructed magnetic heads of FIGS. 9–56, which are the same as that shown and described in relation to FIGS. 13–14 except that a return pole layer is formed over the insulator materials and two additional side studs are formed over previously-formed side studs;

FIGS. 17–18 are a fifth pair of the views of the partially constructed magnetic heads of FIGS. 9–56, which are the same as that shown and described in relation to FIGS. 15–16 except that insulator materials are formed around the return pole layer;

FIGS. 19–20 are a sixth pair of the views of the partially constructed magnetic heads of FIGS. 9–56, which are the same as that shown and described in relation to FIGS. 17–18 except that pole tip materials are formed over the return pole layer and insulator materials;

FIGS. 21–22 are a seventh pair of the views of the partially constructed magnetic heads of FIGS. 9–56, which are the same as that shown and described in relation to FIGS. 19–20 except that a resist layer is formed along the ABS followed by the formation of a mask over the resist layer in a central region;

FIGS. 23–24 are an eighth pair of the views of the partially constructed magnetic heads of FIGS. 9–56, which are the same as that shown and described in relation to FIGS. 21–22 except that resist materials exposed outside the mask are etched;

FIGS. 25–26 are a ninth pair of the views of the partially constructed magnetic heads of FIGS. 9–56, which are the same as that shown and described in relation to FIGS. 23–24 except that ion milling is performed on pole tip materials exposed outside the resist;

FIGS. 27–28 are a tenth pair of the views of the partially constructed magnetic heads of FIGS. 9–56, which are the same as that shown and described in relation to FIGS. 29–30 except that the pole tip materials exposed outside the resist are removed and a pole tip structure is formed underneath the resist;

FIGS. 29–30 are an eleventh pair of the views of the partially constructed magnetic heads of FIGS. 9–56, which are the same as that shown and described in relation to FIGS. 27–28 except that non-magnetic materials are deposited so as to surround the pole tip structure;

FIGS. 31–32 are a twelfth pair of the views of the partially constructed magnetic heads of FIGS. 9–56, which are the same as that shown and described in relation to FIGS. 29–30 except that a planarization process is performed to form a top planarized surface with the deposited non-magnetic materials and the pole tip structure;

FIGS. 33–34 are a thirteenth pair of the views of the partially constructed magnetic heads of FIGS. 9–56, which are the same as that shown and described in relation to. FIGS. 31–32 except that additional non-magnetic materials are deposited over the top planarized surface to form a gap layer;

FIGS. 39–40 are a sixteenth pair of the views of the partially constructed magnetic heads of FIGS. 9–56, which are the same as that shown and described in relation to FIGS. 37–38 except that side shield openings are formed within the resist layer;

FIGS. 41–42 are a seventeenth pair of the views of the partially constructed magnetic heads of FIGS. 9–56, which are the same as that shown and described in relation to FIGS. 39–40 except that side shield voids are etched in the non-magnetic materials along the ABS with non-magnetic materials left around the pole tip structure;

FIGS. 43–44 are an eighteenth pair of the views of the partially constructed magnetic heads of FIGS. 9–56, which are the same as that shown and described in relation to FIGS. 41–42 except that the patterned resist layer is removed;

FIGS. 45–46 are a nineteenth pair of the views of the partially constructed magnetic heads of FIGS. 9–56, which are the same as that shown and described in relation to FIGS. 43–44 except that insulator materials are formed over the structure;

FIGS. 47–48 are a twentieth pair of the views of the partially constructed magnetic heads of FIGS. 9–56, which are the same as that shown and described in relation to FIGS. 45–46 except that a planarization process (e.g. CMP) is performed over the top surface until the stop layer is reached;

FIGS. 49–50 are a twenty-first pair of the views of the partially constructed magnetic heads of FIGS. 9–56, which are the same as that shown and described in relation to FIGS. 47–48 except that the stop layer is removed;

FIGS. 51–52 are a twenty-second pair of the views of the partially constructed magnetic heads of FIGS. 9–56, which are the same as that shown and described in relation to FIGS. 49–50 except that a patterned resist structure for a trailing shield is formed over the top surface of the structure;

FIGS. 53–54 are a twenty-third pair of the views of the partially constructed magnetic heads of FIGS. 9–56, which are the same as that shown and described in relation to FIGS. 51–52 except that a trailing shield is electroplated within the patterned resist structure; and FIGS. 55–56 are a twenty-fourth pair of the views of the partially constructed magnetic heads of FIGS. 9–56, which are the same as that shown and described in relation to FIGS. 53–54 except that the patterned resist structure is removed and insulator materials are formed adjacent the trailing shield.

DETAILED DESCRIPTION OF THE PREFERRED EMBODIMENTS

Methods of fabricating magnetic write heads with side and trailing shields are described herein. One illustrative method includes the acts of forming a pole tip structure at least partially over a magnetic shaping layer; forming non-magnetic materials around and over the pole tip structure; etching side shield voids within the non-magnetic materials adjacent the pole tip structure while leaving non-magnetic materials around the pole tip structure; electroplating side shield materials within the side shield voids, and forming, over the non-magnetic materials above the pole tip structure, trailing shield materials which connect with the side shield materials adjacent the pole tip structure. Preferably, the non-magnetic materials are etched with use of a reactive ion etching (RIE) process. For etching the side shield voids and electroplating the side shield materials, the method may include the additional acts of forming a stop layer over the non-magnetic materials; forming a resist layer over the stop layer; patterning side shield openings through the resist layer; etching the side shield voids in the non-magnetic materials with the patterned resist layer in place; removing the patterned resist layer; electroplating the side shield materials over the non-magnetic materials and within the side shield voids; and performing a planarization process (e.g. a chemical-mechanical polishing or CMP) until the stop layer is reached.

The following description is the best embodiment presently contemplated for carrying out the present invention. This description is made for the purpose of illustrating the general principles of the present invention and is not meant to limit the inventive concepts claimed herein.

Figure 1:
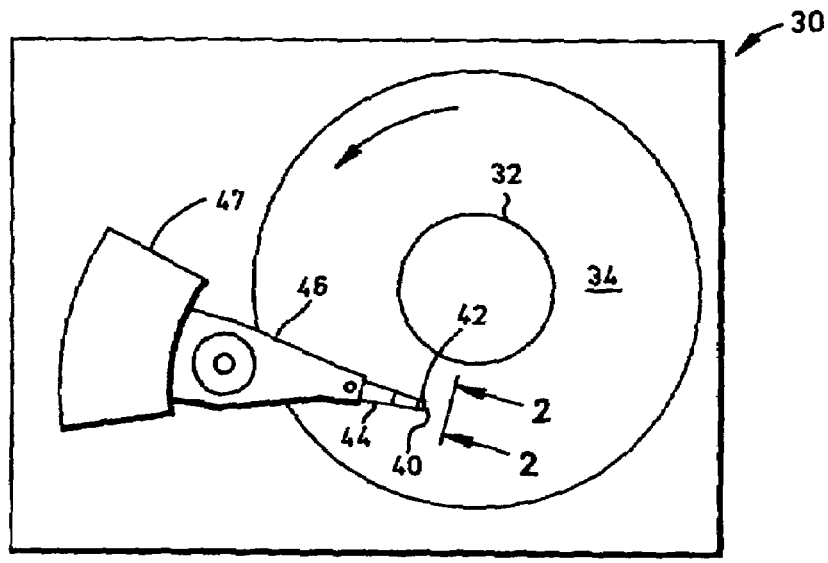
FIG. 1 is a planar view of an exemplary magnetic disk drive.
Figure 2:
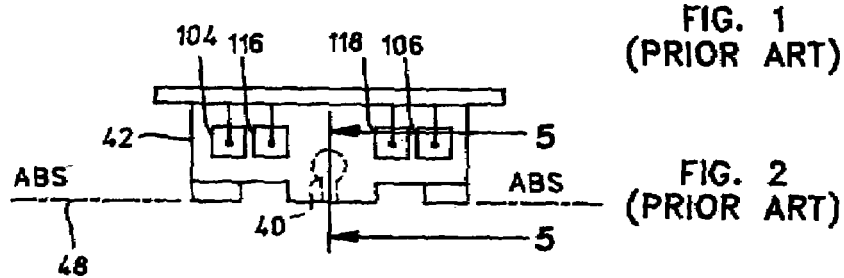
FIG. 2 is an end view of a slider with a magnetic head of the disk drive as seen in plane 2—2 of FIG. 1.
Figure 3:
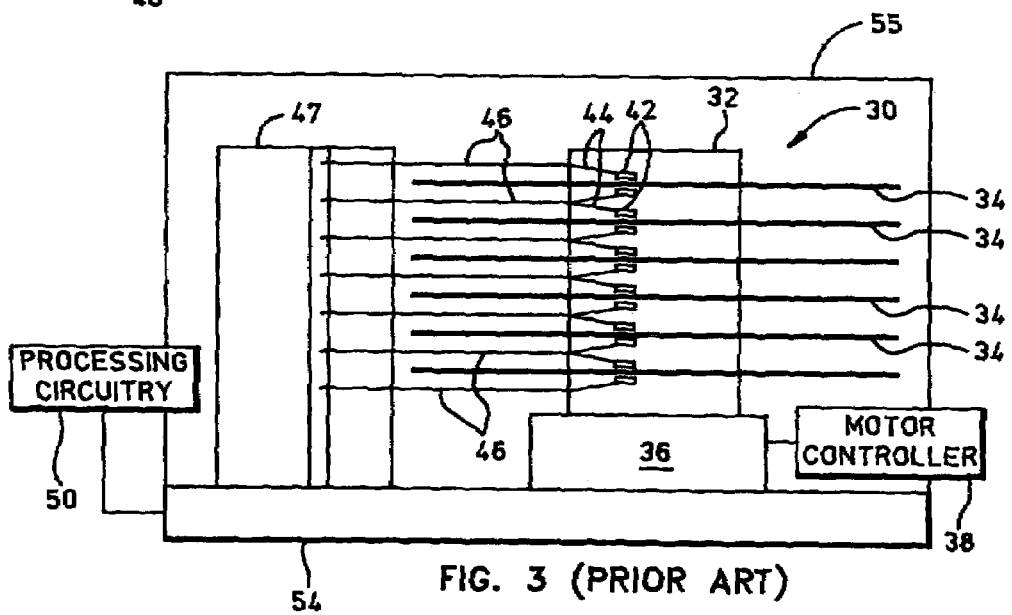
FIG. 3 is an elevation view of the magnetic disk drive wherein multiple disks and magnetic heads are employed.
Figure 4:
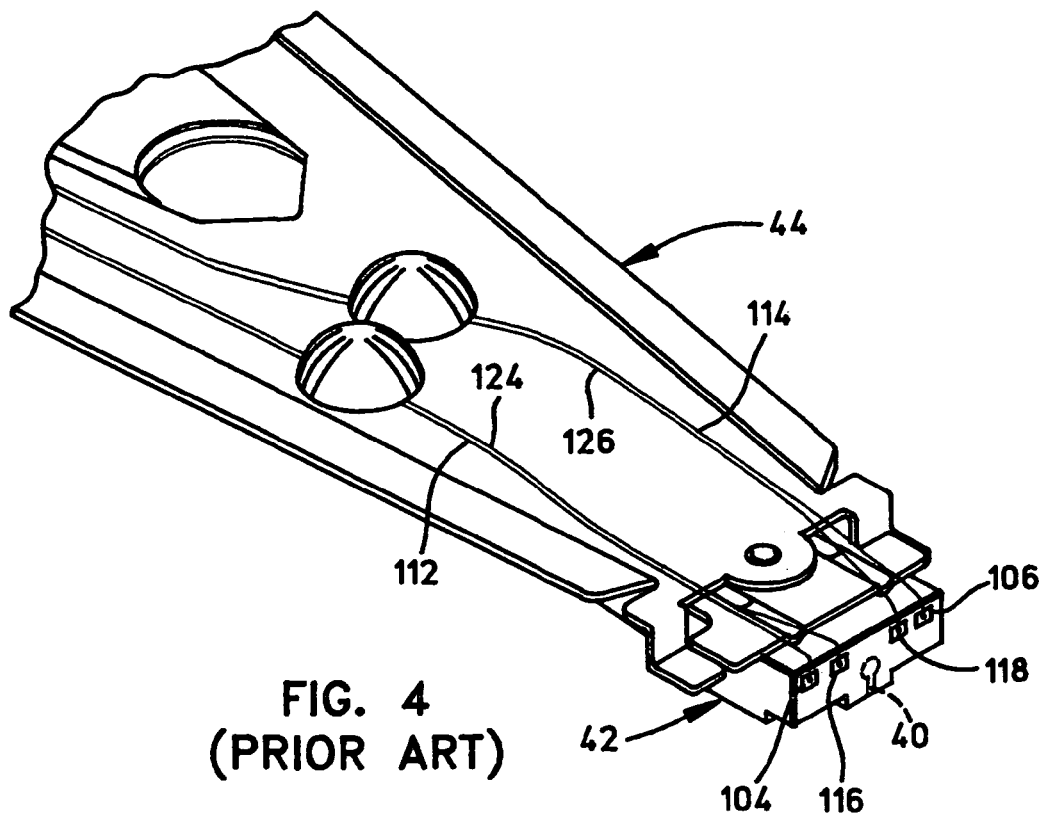
FIG. 4 is an isometric illustration of an exemplary suspension system for supporting the slider and magnetic head.
Figure 5:
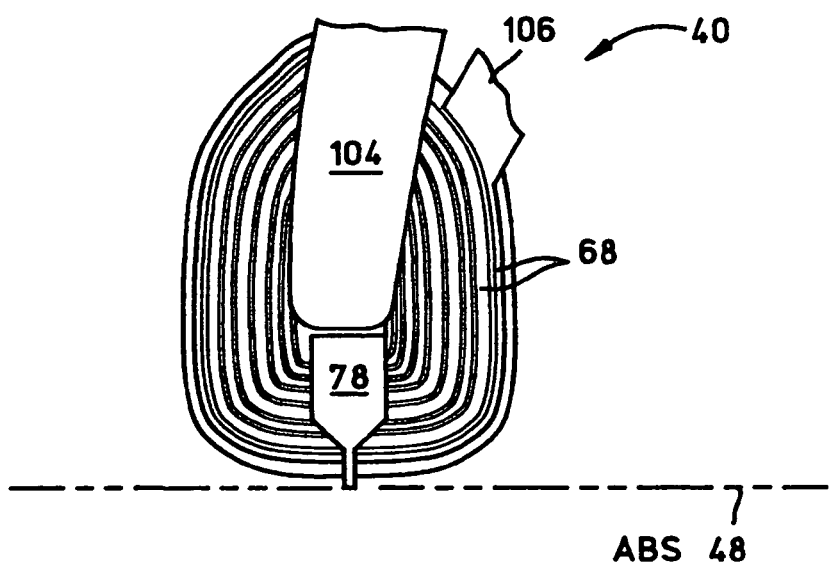
FIG. 5 is a view taken along plane 5—5 of FIG. 2 with all material above the coil layer and leads removed.

Referring now to the drawings, wherein like reference numerals designate like or similar parts throughout the several views, there is illustrated in FIGS. 1–3 a magnetic disk drive 30. The drive 30 includes a spindle 32 that supports and rotates a magnetic disk 34. The spindle 32 is rotated by a motor 36 that, in turn, is controlled by a motor controller 38. A horizontal combined magnetic head 40 for reading and recording is mounted on a slider 42. The slider 42 is supported by a suspension 44 and actuator arm 46. A plurality of disks, sliders and suspensions may be employed in a large capacity direct access storage device (DASD), as shown in FIG. 3. The suspension 44 and actuator arm 46 position the slider 42 to locate the magnetic head 40 in a transducing relationship with a surface of the magnetic disk 34. When the disk 34 is rotated by the motor 36, the slider is supported on a thin cushion of air (air bearing) between the disk and an air bearing surface (ABS) 48. The magnetic head 40 may be employed for writing information to multiple circular tracks on the surface of the disk 34 with use of a write head, as well as for reading information therefrom with use of a read sensor. Processing circuitry 50 exchanges signals representing such information with the head 40, provides motor drive signals, and also provides control signals for moving the slider 42 to various tracks. In FIGS. 1 and 4 the slider 42 is shown mounted to a head gimbal assembly (HGA) 52 that is mounted to the suspension 44. All of the above components are supported on a base 53. A coil layer 68 (FIG. 5) of the write head is used to produce magnetic write flux in a write head structure. As shown in FIGS. 2 and 4, first and second solder connections 88 and 90 connect leads (not shown) from the read sensor to leads 96 and 98 on the suspension 44; third and fourth solder connections 100 and 102 connect leads 104 and 106 from the coil layer 68 to leads 108 and 110 on the suspension.

Figure 6:
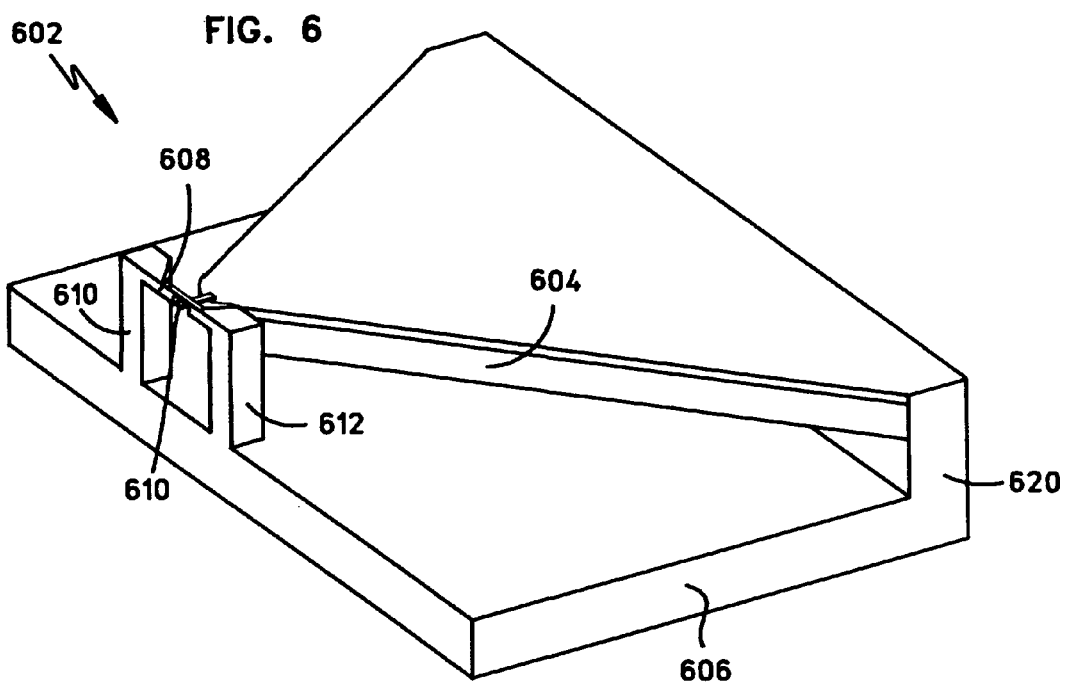
FIG. 6 is an isometric view of a write head structure having side and trailing shields of the present application.
Figure 7:
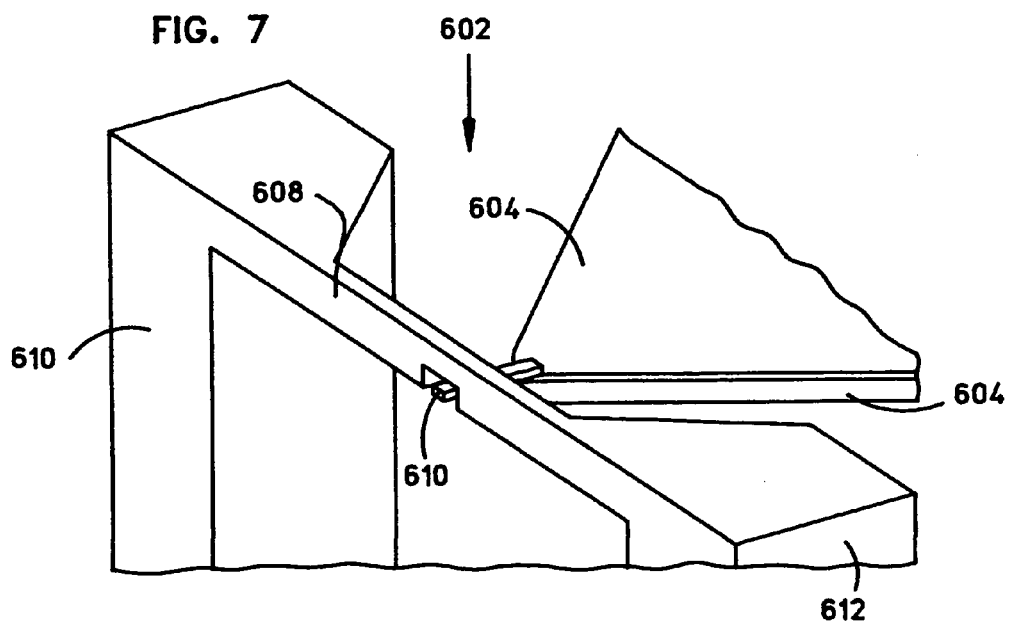
FIG. 7 is a close-up view of a pole tip region of FIG. 6.
Figure 8:
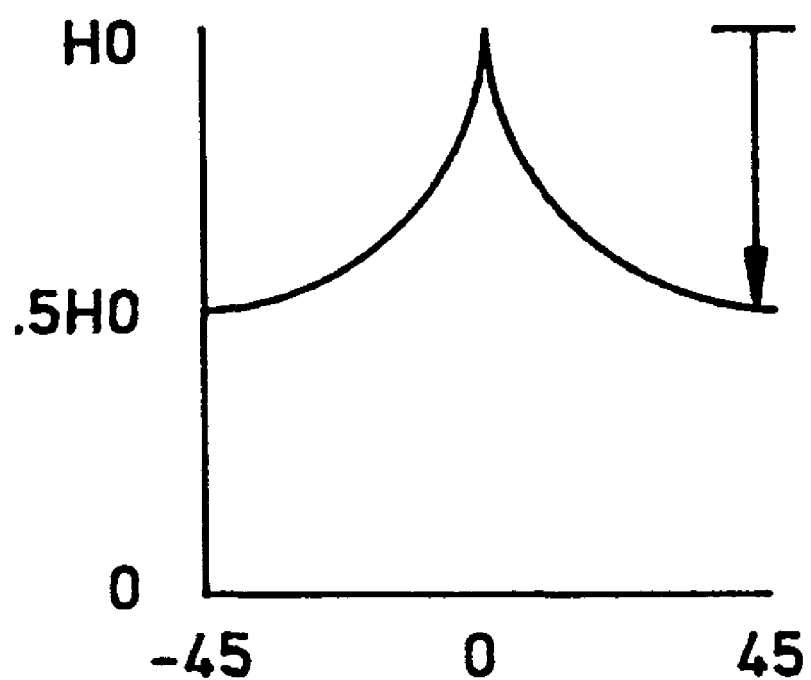
FIG. 8 is a plot of H-grain angle as a function of mean grain angle of a Stoner-Wohlfarth model for a single pole writer (SPT) design.

FIG. 6 is an isometric view of a write head structure 602 of the present application, which may be utilized in the disk drive shown and described in relation to FIGS. 1–5. FIG. 7 is a close-up view of a pole tip structure 610 of this write head structure 602. Write head structure 602 includes a magnetic return pole layer 606, a magnetic shaping layer 604 coupled to return pole layer 606 through back gap materials 620, pole tip structure 610 formed at least partially over shaping layer 604, a side and trailing shield structure 608 formed around pole tip structure 610 and magnetically connected to return pole layer 606 through magnetic side studs 610 and 612. Non-magnetic write gap materials are formed between pole tip structure 610 and shield structure 608. Write coils (not shown in FIGS. 6–7) formed between shaping layer 604 and return pole layer 606 are used to induce a magnetic write flux in shaping layer 604. The magnetic write flux in shaping layer 604 reaches pole tip structure 610, where a majority of the flux is transferred to the media (e.g. disk). Some of the write flux, however, is captured by the trailing shield of shield structure 608 which provides an improved write flux gradient for the write head. Some of the write flux is alternatively captured by the side shields of shield structure 608, but these are stray fields which are captured to improve overwrite capability and reduce adjacent track interference (ATI). All write flux that is captured by side and trailing shield structure 608 is transferred through side studs 610 and 612 and returned through return pole layer 606. The theory of operation of write head structure 602 is based on the Stoner-Wohlfarth model, where FIG. 8 shows the plot 800 of H-grain angle as a function of mean grain angle described earlier above.

FIGS. 9–10 are a first pair of several ABS and cross-sectional view pairs of partially constructed magnetic heads of FIGS. 9–56, which help describe a method of making the write head structure of the present application. The method described in relation to FIGS. 9–56 may be used in the fabrication of the magnetic head described above in relation to FIGS. 1–8.

Beginning with FIGS. 9–10, a read sensor 906 is formed in between bottom and top magnetic shield layers 902 and 904. In this embodiment, top shield layer 904 serves as and will be referred to as a return pole layer for the write head. In FIGS. 11–12, it is shown that two magnetic side studs 1102 and 1104 are formed at the ABS over and in contact with return pole layer 904. In the back gap region, magnetic back gap materials 1204 (FIG. 12) are formed over and in contact with return pole layer 904. In addition, write coil layers 1202 with surrounding insulator materials 1206 (FIG. 12) are formed over return pole layer 904 in between side studs 1102 and 1104 and back gap materials 1204. An isolation layer 1302 made of alumina ($Al_2O_3$) or other suitable material is formed between these write coil layers 1202 and return pole layer 904. Non-magnetic insulator materials 1110 are formed over return pole layer 904 and adjacent side studs 1102 and 1104. In FIGS. 13–14, it is shown that a planarization process such as a chemical-mechanical polishing (CMP) is performed on the structure of FIGS. 11–12 to remove excess insulator materials and to form a top planarized surface for the structure. An isolation layer 1304 is formed over write coil layers 1202 to provide for isolation from subsequently formed components, but isolation layer 1304 is not formed over side studs 1104 and back gap materials 1204.

There are two different approaches to fabricate side studs 1102 and 1104, back gap materials 1204, and write coil layers 1202 as shown in FIGS. 11–14. The first approach forms write coil layers 1202 first, followed by the formation of side studs 1102 and 1104 and back gap materials 1204. In particular, insulating layer 1302 is deposited and a seed layer is formed over it. Write coil layers 1202 are then formed over the seed layer, which is subsequently removed by etching, and write coil layers 1202 are encapsulated with insulator materials. A photolithography and etching process is then performed to remove portions of insulator material and to expose top surface portions of return pole layer 904 where the side studs and back gap materials are to be formed. Side studs 1102 and 1104 and back gap materials 1204 are then fabricated by depositing a seed layer, forming a patterned resist, electroplating magnetic materials within the patterned resist, and removing the seed layer by etching. Insulator materials are subsequently formed between side studs 1102 and 104, back gap materials 1204, and write coil layers 1202. In the second approach, side studs 1102 and 1104 and back gap materials 1204 are formed first, followed by the formation of write coil layers 1202.

Note that there are two different techniques to form write coil layers 1202; one is a damascene technique and the other is a through-mask-plating (TMP) technique. In the damascene technique, a pocket between side studs 1102 and 1104 and back gap materials 1204 is filled with a reactive ion etchable (RIEable) material and an image transfer process is performed on the RIEable material in accordance with the write coil pattern. A damascene seed and electroplating process are then performed to fabricate write coil layers 1202. In the TMP technique, an insulator material is formed within the pocket between side studs 1102 and 1104 and back gap materials 1204 and a seed layer is formed over it. A patterned resist is formed over the seed layer, conductive materials (e.g. copper) are electroplated within the patterned resist, the seed layer is removed by etching, and the insulator materials are deposited. In any case, the CMP is performed to form a top planarized surface over the structure.

Although not shown in FIGS. 13–14, side studs 1102 and 1104 may be formed as a single continuous structure such as a pedestal that spans at least partially over the width of return pole layer 904. In addition, although the structure is shown to be exposed at the ABS, in an alternate embodiment the structure may be recessed from the ABS depending on the design requirements.

In FIGS. 15–16, a magnetic shaping layer 1502 is formed primarily over isolation layer 1304 with a front edge that is recessed behind the ABS. In the back gap region, shaping layer 1502 is formed in contact with back gap materials 1204. Connecting side studs 1504 and 1506 are simultaneously formed in contact and in line with side studs 1102 and 1104, respectively, in the same horizontal plane of shaping layer 1502. An opening 1602 (FIG. 16) is left between connecting side studs 1504 and 1506 and shaping layer 1502. Shaping layer 1502 and connecting side studs 1504 and 1506 may be made with magnetic materials such as nickel-iron (NiFe) or other suitable magnetic material.

Preferably, shaping layer 1502 and connecting side studs 1504 and 1506 are formed using conventional electroplating techniques. The thickness of shaping layer 1502 may be between about 1.5 μm depending on the type of design or optimal thickness for flux conduction to the write pole. Again, the side studs may be exposed at the ABS as shown or alternatively recessed from the ABS. Although not shown in the figures, side studs can be connecting side studs or, depending on the design, the connecting side studs can be formed with an optimal shape to function as the side shielding.

In FIGS. 17–18, non-magnetic insulator materials 1702 are formed around left and right sides of the recessed shaping layer 1502 as well as adjacent connecting side studs 1504 and 1506 in front of the recessed shaping layer 1502 at the ABS. These insulator materials 1702 may be formed by depositing insulator materials such as alumina ($Al_2O_3$) over the entire structure of FIGS. 15–16, and subsequently performing a planarization process such as a CMP. This results in a top planarized surface with the tops of shaping layer 1502, connecting side studs 1504 and 1506, and insulator materials 1702. Thus, a partially constructed magnetic head having return pole layer 904, side studs 1102 and 1104 formed over return pole layer 904 at the ABS, and shaping layer 1502 with a front edge that is recessed behind the ABS is thereby provided.

In FIGS. 19–20, it is shown that pole tip materials 1902 are formed in full film over the planarized top surface of the structure. Pole tip materials 1902 include magnetic materials such as nickel-iron (NiFe), cobalt-iron (CoFe), or the like. Preferably, pole tip materials 1902 are made of a plurality of alternating layers of magnetic and non-magnetic materials. For example, the alternating layers of pole tip materials 1902 may include layers of cobalt-iron (CoFe) with either ruthenium (Ru), chromium (Cr), rhodium (Rh), alumina ($Al_2O_3$), or the like.

In FIGS. 21–22, a stop layer 2106 is formed in full film over the top surface of pole tip materials 1902. Preferably, stop layer 2106 is carbon (C) but could be another suitable material such as rhodium (Rh) or ruthenium (Ru). A hard mask layer 2102 is then formed in full film over stop layer 2106. Hard mask layer 2102 may be made of polymide or epoxy, for example. Next, a central resist structure 2104 is formed over hard mask layer 2102 along the ABS in a central area. Preferably, central resist structure 2104 is made of a silicon-containing resist. The width of central resist structure 2104 is formed wider than the desired width of a pole tip to bevel and trim the write pole's trackwidth to be formed. Note also that a rear edge of central resist structure 2104 extends over only a small portion of shaping layer 1502. Exposed portions of hard mask layer 2102 and stop layer 2106 are then patterned in accordance with central resist structure 2104 and removed, resulting with the structure shown in FIGS. 23–24. The materials may be removed using etching techniques such as by RIE. Thus, a central hard mask 2302 and a central stop layer 2106 are formed underneath central resist structure 2104, such that top surfaces of pole tip materials 1902 outside central resist structure 2104 are exposed.

Note that an additional layer may be deposited between hard mask layer 2102 and central resist structure 2104 to separate the RIE into two separate steps using different RIE chemistry for better selectivity. For example, the additional layer may be a RIEable material such as Ta, $Ta_2O_5$, $SiO_xN_y$, $SiO_2$, $Si_3N_4$, and $Ta_3N_5$, as examples. The first RIE chemistry may be based on a fluorocarbon such as $CF4/CHF_3$, for example, and the second RIE chemistry may be based on $O_2$, $CO_2$, $NH3/H_2$, or $H_2/N_2$, as examples.

In FIGS. 25–26, an ion milling process 2502 is then performed over the structure to remove pole tip materials 1902 exposed outside central resist structure 2104. The resulting structure is shown in FIGS. 27–28, where a pole tip structure 1902 is produced underneath central resist structure 2104 from the pole tip materials. The write pole, which includes pole tip structure 1902 and a yoke formed behind it, at least partially contacts a top surface of the front end of shaping layer 1502 (see FIG. 26). The write pole may be stitched to shaping layer 1502 with use of a resist to protect the pole tip and side shields during the ion mill while exposing a portion of the yoke to the ion mill. At the ABS, a bottom surface of the front end of pole tip structure 1902 is formed over insulator materials. Note that, at the ABS, the trackwidth and bevel angle of pole tip structure 1902 is defined by the ion mill.

In FIGS. 29–30, it is shown that non-magnetic materials 2902 are then deposited over the structure. Non-magnetic materials 2902 are also "RIEable" materials, meaning that they are removable with use of a reactive ion etching (RIE) process. These non-magnetic materials 2902 may be referred to as hard mask materials, which may be or include Ta, $Ta_2O_5$, $SiO_xN_y$, $SiO_2$, $Si_3N_4$, and $Ta_3N_5$, as examples. Non-magnetic materials 2902 are formed to a height that exceeds the height of stop layer 2106. In FIGS. 31–32, a planarization process such as a CMP is performed over the structure so as to form a top planarized surface with non-magnetic materials 3302 and pole tip structure 1902. The CMP is performed until the stop layer (FIGS. 29–30) above the pole is reached, which resists any further CMP. The CMP removes top portions of non-magnetic RIEable materials 2902 as well as planarizes the top surface of the structure. Non-magnetic materials 3302 are left remaining adjacent and behind pole tip structure 1902. Note that, as an option, an additional CMP stop layer is deposited in the field and adjacent pole tip structure 1902 prior to the CMP for enhanced CMP stopping.

Next in FIGS. 33–34, a layer of additional non-magnetic materials 3302 are deposited over the existing non-magnetic materials. This layer of additional non-magnetic materials 3302 will serve as a trailing shield gap layer for the write head. The thickness of the trailing shield gap layer will depend on the head design and a real density. Note that a RIE step is performed to remove the stop layer above the pole (as well as the optional CMP stop layer in the field adjacent to the pole structure) prior to the deposition of non-magnetic materials 3302.

Figure 35:
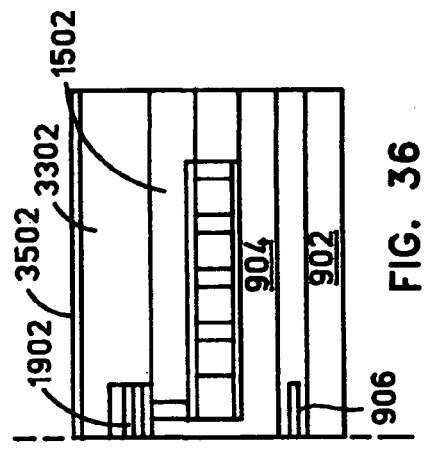
FIGS. 35–36 are a fourteenth pair of the views of the partially constructed magnetic heads of FIGS. 9–56, which are the same as that shown and described in relation to FIGS. 33–34 except that a stop layer is formed over the gap layer.
Figure 36:
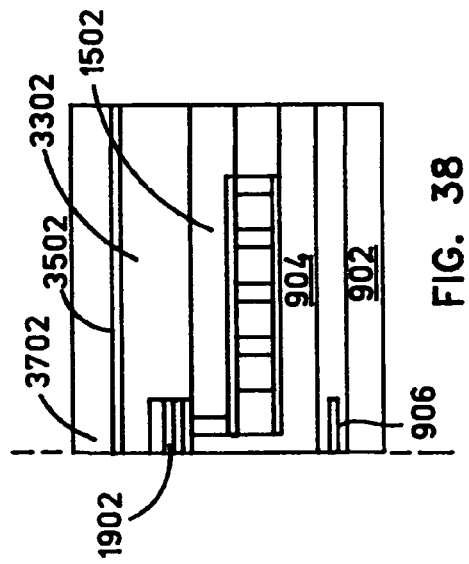
Figure 37:
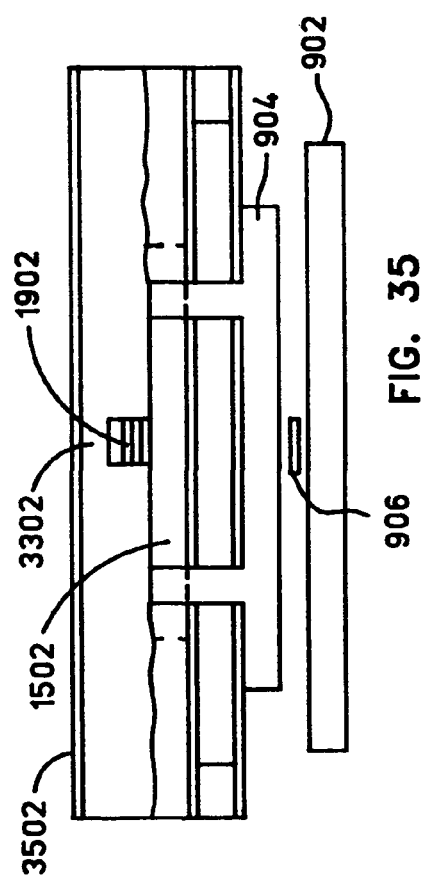
FIGS. 37–38 are a fifteenth pair of the views of the partially constructed magnetic heads of FIGS. 9–56, which are the same as that shown and described in relation to FIGS. 35–36 except that a resist layer is formed over the stop layer.
Figure 38:
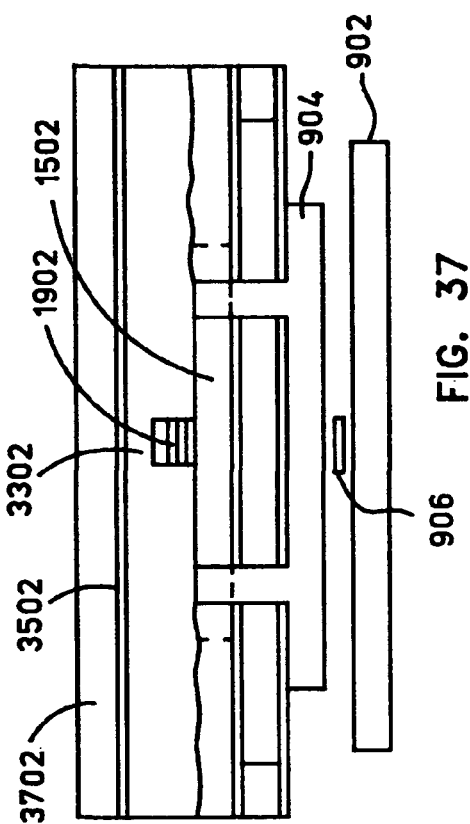

Next, in FIGS. 35–36, a stop layer 3502 is deposited in full film over non-magnetic materials 3302. Preferably, stop layer 3502 is carbon (C). In FIGS. 37–38, a resist layer 3702 is formed in full film over stop layer 3502. Through exposure and development, resist layer 3702 is patterned to form two side shield openings 3902 and 3904 as shown in FIGS. 39–40. Side shield openings 3902 and 3904 are formed through resist layer 3702 so as to flank over pole tip structure 1902 at the ABS as shown. Materials of stop layer 3502 at a bottom of side shield openings 3902 and 3904 are then removed with use of a RIE. This exposes top surfaces of non-magnetic materials 3302 at the bottom of side shield openings 3902 and 3904.

In FIGS. 41–42, non-magnetic materials 3302 exposed through the side shield openings are etched with resist layer 3702 in place to thereby form two side shield voids 4102 and 4104 as shown. Specifically, the etch is a RIE which is continued until the top surfaces of connecting side studs 1504 and 1506 and the insulator materials adjacent side studs 1504 and 1506 are reached and exposed. Note that surrounding non-magnetic materials 4106 are left remaining around pole tip structure 1902. Preferably, the aspect ratio of each side shield void 4102 and 4104 is made to be 1:1 or 1:1.5. The aspect ratio of side shield voids 4102 and 4104 refers to the ratio of its height to width. Resist layer 3702 is then removed with use of a suitable solvent, producing the resulting structure shown in FIGS. 43–44. After the resist layer is removed, a top surface of stop layer 3502 formed over non-magnetic materials 3302 is exposed. A thin magnetic seed layer should then be deposited in full film over the structure. The seed layer may be made of magnetic materials such as nickel-iron (NiFe).

In FIGS. 45–46, magnetic materials 4502 are then electroplated in full film over the structure. By doing this, magnetic materials 4502 are formed within side shield voids 4102 and 4104 which make contact with the top surfaces of the connecting side studs. The magnetic materials may be nickel-iron (NiFe), cobalt-iron (CoFe), or alloys thereof Since the aspect ratio of side shield voids 4102 and 4104 is 1:1 or 1:1.5, little or no voids will be formed in magnetic materials 4502 within these voids 3902 and 3904. Next, a planarization process such as a CMP is performed over the structure, with the result shown in FIGS. 47–48. Note that the CMP is performed until stop layer 3502 is reached, which resists any further CMP. As revealed, side shields 4702 and 4704 are thereby produced so as to flank pole tip structure 1902 with non-magnetic materials 4106 surrounding pole tip structure 1902. Connecting side studs 4706 and 4708 which are integrally part of the side shield materials are also produced to connect with connecting side studs 1504 and 1506. A top planarized surface is also made with the tops of non-magnetic materials 3302, connecting side studs 4706 and 4708, and side shields 4702 and 4704. Stop layer 3502 is subsequently removed by RIE, with the result shown in FIGS. 49–50. After removing the stop layer, a thin magnetic seed layer is formed over the structure. The seed layer may be made of magnetic materials such as nickel-iron (NiFe).

In FIGS. 51–52, a resist structure 5102 for a trailing shield is then formed over the structure. This is done by forming a full film resist layer, followed by suitable patterning and development such that a trailing shield opening 5104 is produced within resist structure 5102. As shown, the trailing shield opening 5104 is formed along the ABS over pole tip structure 1902, side shields 4702 and 4704, and connecting side studs 4706 and 4708. In FIGS. 53–54, a trailing shield 5302 is then electroplated within trailing shield opening 5104. Trailing shield 5302 is made of a magnetic material, such as nickel-iron (NiFe) or other suitable material. Note that the top surfaces of connecting side studs 4706 and 4708 make contact with bottom surface portions of trailing shield 5302 so as to be magnetically connected. Also, trailing shield 5302 is located just above pole tip structure 1902 with trailing shield gap layer 3302 formed therebetween. After removal of resist structure 5102 with a suitable solvent, remaining seed layer materials over the top surface of non-magnetic materials 3302 are removed by etching, such as by ion beam milling.

In an alternate embodiment for fabricating the trailing shield, beginning with that shown in FIGS. 49–50, a RIEable non-magnetic material is deposited followed by the deposition of a CMP stop layer (e.g. carbon). A full film of resist is formed over the top surface, followed by suitable patterning and development to produce trailing shield opening 5104 within resist structure 5102. Next, a two step etch by RIE to etch the CMP stop layer and the non-magnetic material to pattern transfer into the non-magnetic material. The resist is removed by full film deposition of a magnetic material such as NiFe to fill the opening, followed by a CMP to planarize and stop on the CMP stop layer.

In another alternate embodiment for fabricating the trailing shield, beginning with that shown in FIGS. 29–30, the formation of additional non-magnetic material 3302 is omitted. The fabrication continues with FIGS. 35–50. A conductive non-magnetic layer is deposited, followed by photolithography and a light ion mill step in order to remove conductive non-magnetic layer at 4706, 4708, 4702, and 4704. The trailing shield structure is then fabricated according to FIGS. 51–52.

In FIGS. 55–56, insulator materials 5502 are deposited over the entire structure and optionally followed by a planarization process such as a CMP. Insulator materials 5502 may be alumina ($Al_2O_3$) or other suitable non-magnetic insulating material. As shown, insulator materials 5502 are formed adjacent trailing shield 5302 as well as behind the ABS and trailing shield 5302 over non-magnetic materials 3302. Other processes, conventional or otherwise, may be used to complete the fabrication of the magnetic head. Thus, a write head with side and trailing shields is thereby formed.

The above-described method is advantageous in the various techniques used for fabricating the pole tip structure, surrounding non-magnetic materials, and side and trailing shield structure. Although damascene techniques have been utilized in the fabrication of write head structures such as the write coil, the plated material (e.g. copper) is not an alloy and is non-magnetic. Damascene techniques also require a bath additive to suppress plating in particular desired areas. In the present method, no damascene techniques are utilized for forming the side and trailing shield. Magnetic materials for the shields are electroplated in shield voids that are suitably constructed such that little or no voids in the magnetic materials remain.

Final Comments. Methods of fabricating write heads having side and trailing shield structures have been described. One illustrative method includes the acts of forming a pole tip structure at least partially over a shaping layer; forming non-magnetic materials around and over the pole tip structure; etching side shield voids within the non-magnetic materials adjacent the pole tip structure while leaving non-magnetic materials around the pole tip structure; electroplating side shield materials within the side shield voids; and forming, over the non-magnetic materials above the pole tip structure, trailing shield materials which connect with the side shield materials adjacent the pole tip structure. Preferably, the non-magnetic materials are RIEable and etched with use of a reactive ion etching (RIE) process. For etching the side shield voids and electroplating the side shield materials, the method may include the additional acts of forming a stop layer over the non-magnetic materials; forming a resist layer over the stop layer; patterning side shield openings through the resist layer; etching the side shield voids in the non-magnetic materials (e.g. with RIE) with the patterned resist layer in place; removing the patterned resist layer; electroplating the side shield materials over the non-magnetic materials and within the side shield voids; and performing a planarization process (e.g. a chemical-mechanical polishing or CMP) until the stop layer is reached.

It is to be understood that the above is merely a description of preferred embodiments of the invention and that various changes, alterations, and variations may be made without departing from the true spirit and scope of the invention as set for in the appended claims. Note that the method described herein may be used to fabricate side and trailing shields separately. Few if any of the terms or phrases in the specification and claims have been given any special particular meaning different from their plain language meaning, and therefore the specification is not to be used to define terms in an unduly narrow sense.

What is claimed is:

1. A method of fabricating a magnetic head, comprising:
  forming a pole tip structure at least partially over a magnetic shaping layer;
  forming non-magnetic materials around and over the pole tip structure;
  etching side shield voids within the non-magnetic materials adjacent the pole tip structure while leaving non-magnetic materials around the pole tip structure;
  electroplating side shield materials within the side shield voids; and
  forming, over the side shield materials and the non-magnetic materials above the pole tip structure, trailing shield materials which connect with the side shield materials.

2. The method of claim 1, wherein the act of etching side shield voids comprises the further acts of:
  forming a resist layer over the non-magnetic materials;
  patterning and developing side shield openings through the resist layer;
  etching, with the patterned resist layer in place, the non-magnetic materials to produce the side shield voids; and
  removing the patterned resist layer.

3. The method of claim 1, wherein the acts of etching side shield voids and electroplating side shield materials within the side shield voids comprise the acts of:
  forming one or more resist layers over the non-magnetic materials;
  patterning and developing side shield openings through the resist layer;
  etching, with the patterned resist layer in place, the non-magnetic materials to produce the side shield voids;
  removing the patterned resist layer;
  electroplating the side shield materials over the non-magnetic materials and within the side shield voids; and
  performing a planarization process over the side shield materials.

4. The method of claim 1, wherein the acts of etching side shield voids and electroplating side shield materials within the side shield voids comprise the acts of:
  forming a stop layer over the non-magnetic materials;
  forming one or more resist layers over the stop layer;
  patterning and developing side shield openings through the resist layer;
  etching, with the patterned resist layer in place, the non-magnetic materials to produce the side shield voids;
  removing the patterned resist layer;
  electroplating the side shield materials over the non-magnetic materials and within the side shield voids; and
  performing a planarization process until the stop layer is reached.

5. The method of claim 1, wherein the act of etching the side shield voids comprises reactive ion etching (RIE).

6. The method of claim 1, wherein an aspect ratio of each side shield void is one of 1:1 and 1:1.5.

7. The method of claim 1, wherein the act of forming the trailing shield materials comprises the further acts of:
- forming a resist layer over the non-magnetic and side shield materials;
- patterning a trailing shield opening through the resist layer over the non-magnetic materials above the pole tip structure;
- etching, with the patterned resist layer in place, the non-magnetic materials to produce a trailing, shield void; and
- electroplating the trailing shield materials within the trailing shield void.

8. The method of claim 1, wherein the non-magnetic materials comprise hard mask materials and wherein the act of etching the side shield voids comprises reactive ion etching (RIE).

9. The method of claim 1, wherein the acts of forming the pole tip structure and forming the non-magnetic materials around the pole tip structure comprise the further acts of:
- forming one or more pole tip structure layers;
- forming a stop layer over the pole tip structure;
- forming one or more resist layers over the stop layer;
- patterning the resist for defining the pole tip structure;
- etching, with the patterned resist layer in place, the pole tip structure layer to form the pole tip structure;
- depositing the non-magnetic materials with the patterned resist layer in place; and
- performing a planarization process until the stop layer is reached.

10. The method of claim 1, wherein the pole tip structure comprises alternating layers of magnetic and non-magnetic materials.

11. A method of fabricating a magnetic head, comprising:
- providing a partially constructed magnetic head having a return pole layer, side studs formed over the return pole layer at an air bearing surface (ABS), and a magnetic shaping layer with a front edge that is recessed behind the ABS;
- forming a pole tip structure at least partially over the magnetic shaping layer with a front edge at the ABS;
- forming non-magnetic materials around and over the pole tip structure;
- etching side shield voids within the non-magnetic materials adjacent the pole tip structure while leaving non-magnetic materials around the pole tip structure;
- electroplating side shield materials within the side shield voids over the side studs; and
- forming, over the side shield materials and the non-magnetic materials above the pole tip structure, trailing shield materials which connect with the side shield materials.

12. The method of claim 11, wherein the act of etching side shield voids comprises the further acts of:
- forming a resist layer over the non-magnetic materials;
- patterning side shield openings through the resist layer;
- etching, with the patterned resist layer in place, the non-magnetic materials to produce the side shield voids; and
- removing the patterned resist layer.

13. The method of claim 11, wherein the acts of etching side shield voids and electroplating side shield materials within the side shield voids comprise the acts of:
- forming one or more resist layers over the non-magnetic materials;
- patterning side shield openings through the resist layer;
- etching, with the patterned resist layer in place, the non-magnetic materials to produce the side shield voids;
- removing the patterned resist layer;
- electroplating the side shield materials over the non-magnetic materials and within the side shield voids; and
- performing a planarization process over the side shield materials.

14. The method of claim 11, wherein an aspect ratio of each side shield void is one of 1:1 and 1:1.5.

15. The method of claim 11, wherein the act of etching the side shield voids comprises reactive ion etching (RIE) and the non-magnetic materials comprise hard mask materials.

16. The method of claim 11, wherein the act of forming the trailing shield materials comprises the further acts of:
- forming a resist layer over the non-magnetic and side shield materials;
- patterning a trailing shield opening through the resist layer over the non-magnetic materials above the pole tip structure;
- etching, with the patterned resist layer in place, the non-magnetic materials to produce a trailing shield void; and
- electroplating the trailing shield materials within the trailing shield void.

17. The method of claim 11, wherein the act of forming the pole tip structure comprises the further acts of:
- forming one or more pole tip layers;
- forming a resist layer over the pole tip layer;
- patterning the resist for defining the pole tip structure; and
- etching, with the patterned resist layer in place, the pole tip layer to form the pole tip structure.

18. The method of claim 11, wherein the acts of forming the pole tip structure and forming the non-magnetic materials around the pole tip structure comprise the further acts of:
- forming one or more pole tip layers;
- forming a stop layer over the pole tip layer;
- forming one or more resist layers over the stop layer;
- patterning the resist for defining the pole tip structure;
- etching, with the patterned resist layer in place, the pole tip layer to form the pole tip structure;
- depositing the non-magnetic materials with the patterned resist layer in place; and
- performing a planarization process until the stop layer is reached.

19. The method of claim 11, wherein at least a portion of the non-magnetic materials serve as a write gap layer between the pole tip structure and the trailing shield materials.

20. A method of fabricating a magnetic head, comprising:
- forming a pole tip structure at least partially over a magnetic shaping layer;
- forming non-magnetic materials around and over the pole tip structure;
- forming one or more resist layers over the non-magnetic materials;
- patterning and developing side shield openings through the resist layer;
- with the patterned resist layer in place: performing a reactive ion etch (RIE) on the non-magnetic materials to produce side shield voids through the non-magnetic materials; and
- electroplating side shield materials within the side shield voids of the non-magnetic materials.

21. The method of claim 20, further comprising:
forming, over the non-magnetic materials above the pole tip structure, trailing shield materials which connect with the side shield materials adjacent the pole tip structure.

22. The method of claim 20, further comprising:
prior to forming the one or more resist layers, forming a stop layer over the non-magnetic materials; and
performing a planarization process over the side shield materials until the stop layer is reached.

23. The method of claim 20, wherein the non-magnetic materials include one of Ta, $Ta_2O_5$, $SiON_X$, $SiO_2$, $Si_3N_4$, and $Ta_3N_5$.

24. The method of claim 20, wherein an aspect ratio of each side shield void is one of 1:1 and 1:1.5.

25. The method of claim 20, wherein the non-magnetic materials comprise hard mask materials.

26. The method of claim 20, wherein the acts of forming the pole tip structure and forming the non-magnetic materials around the pole tip structure comprise the further acts of:
forming one or more pole tip structure layers;
forming a stop layer over the pole tip structure layer;
forming one or more resist layers over the stop layer;
patterning the resist for defining the pole tip structure;
etching, with the patterned resist layer in place, the pole tip structure layer to form the pole tip structure;
depositing the non-magnetic materials with the patterned resist layer in place; and
performing a planarization process until the stop layer is reached.

27. The method of claim 20, wherein the acts of forming the pole tip structure and forming the non-magnetic materials around the pole tip structure the comprise the further acts of:
forming a plurality of pole tip layers made of alternating magnetic and non-magnetic materials;
forming a stop layer over the pole tip layers;
forming one or more resist layers over the stop layer;
patterning the resist for defining the pole tip structure;
etching, with the patterned resist layer in place, the pole tip layers to form the pole tip structure;
depositing the non-magnetic materials with the patterned resist layer in place; and
performing a planarization process until the stop layer is reached.

28. The method of claim 20, wherein the acts of forming the pole tip structure and forming the non-magnetic materials around the pole tip structure the comprise the further acts of:
forming one or more pole tip layers;
forming a stop layer over the pole tip layer;
wherein the stop layer comprises carbon (C);
forming one or more resist layers over the stop layer;
patterning the resist for defining the pole tip structure;
etching, with the patterned resist layer in place, the pole tip layer to form the pole tip structure;
depositing the non-magnetic materials with the patterned resist layer in place; and
performing a planarization process until the stop layer is reached.

29. The method of claim 20, wherein the acts of forming the pole tip structure and forming the non-magnetic materials around the pole tip structure the comprise the further acts of:
forming one or more pole tip layers;
forming a stop layer over the pole tip layer;
forming one or more resist layers over the stop layer;
patterning the resist for defining the pole tip structure;
etching, with the patterned resist layer in place, the pole tip layer to form the pole tip structure;
depositing the non-magnetic materials with the patterned resist layer in place;
performing a planarization process until the stop layer is reached; and
wherein the planarization process comprises a chemical-mechanical polishing (CMP).

30. The method of claim 20, further comprising:
forming, over the non-magnetic materials above the pole tip structure, trailing shield materials which connect with the side shield materials adjacent the pole tip structure;
wherein the act of forming the trailing shield materials comprises the further acts of:
forming a resist layer over the non-magnetic and side shield materials;
patterning a trailing shield opening through the resist layer over the non-magnetic materials above the pole tip structure;
etching, with the patterned resist layer in place, the non-magnetic materials to produce a trailing shield void; and
electroplating the trailing shield materials over the non-magnetic materials and within the trailing shield void.

31. A method of forming a trailing shield for a magnetic head, comprising:
forming, over non-magnetic materials above a pole, tip structure, magnetic trailing shield materials which connect with side shield materials adjacent the pole tip structure by:
forming a resist layer over the non-magnetic and side shield materials;
patterning a trailing shield opening through the resist layer over the non-magnetic materials above the pole tip structure;
etching, with the patterned resist layer in place, the non-magnetic materials to produce a trailing shield void; and
electroplating the trailing shield materials over the non-magnetic materials and within the trailing shield void.

* * * * *